United States Patent
Park et al.

(10) Patent No.: US 9,081,658 B2
(45) Date of Patent: Jul. 14, 2015

(54) STORAGE DEVICE AND DATA MANAGEMENT METHOD THEREOF

(71) Applicant: Samsung Electronics Co., Ltd., Suwon-si (KR)

(72) Inventors: Hyunchul Park, Ansan-si (KR); Sangmok Kim, Seoul (KR); Kyung Ho Kim, Seoul (KR); Otae Bae, Daegu (KR); Donggi Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 195 days.

(21) Appl. No.: 13/734,244

(22) Filed: Jan. 4, 2013

(65) Prior Publication Data

US 2013/0179647 A1    Jul. 11, 2013

(30) Foreign Application Priority Data

Jan. 9, 2012 (KR) .................. 10-2012-0002547

(51) Int. Cl.
*G06F 12/00* (2006.01)
*G06F 12/02* (2006.01)

(52) U.S. Cl.
CPC ............ *G06F 12/02* (2013.01); *G06F 12/0238* (2013.01); *G06F 12/0246* (2013.01); *G06F 2212/7202* (2013.01); *G06F 2212/7203* (2013.01)

(58) Field of Classification Search
USPC .................................................. 711/154, 170
See application file for complete search history.

(56) References Cited

U.S. PATENT DOCUMENTS

| 6,691,177 B2 | 2/2004 | Utsunomiya et al. |
| 6,816,946 B2 | 11/2004 | Magoshi |

(Continued)

FOREIGN PATENT DOCUMENTS

| JP | 2003-256269 | 9/2003 |
| JP | 2011-107983 | 6/2011 |

(Continued)

OTHER PUBLICATIONS

Chiang et al. "Using data clustering to improve cleaning performance for plash memory", Software—Practice & Experience, 40 pages; v.29 n.3, Mar. 1999; Taiwan.

(Continued)

*Primary Examiner* — Matthew Bradley
(74) *Attorney, Agent, or Firm* — Myers Bigel Sibley & Sajovec, P.A.

(57) ABSTRACT

Disclosed is a data managing method of a storage device which includes at least one nonvolatile memory device and a controller controlling the nonvolatile memory device. The data managing method includes receiving an input/output request and generating a section directing logical addresses based on the input/output request. The section is managed using section information, and the section information includes a start logical address corresponding to the input/output request, spatial locality information having the number of the directed logical addresses, and historical request information.

16 Claims, 27 Drawing Sheets

(56) References Cited

U.S. PATENT DOCUMENTS

| | | | |
|---|---|---|---|
| 7,529,895 B2 * | 5/2009 | Blumrich et al. | 711/151 |
| 7,562,176 B2 | 7/2009 | Kloeppner et al. | |
| 7,689,774 B2 | 3/2010 | O'Connell et al. | |
| 2009/0300040 A1 | 12/2009 | Kaijima et al. | |
| 2010/0015211 A1 | 1/2010 | Barnett et al. | |
| 2011/0072231 A1 | 3/2011 | Lee et al. | |
| 2011/0093649 A1 | 4/2011 | Lee | |
| 2011/0145502 A1 | 6/2011 | Joshi et al. | |

FOREIGN PATENT DOCUMENTS

| | | |
|---|---|---|
| KR | 10-2009-0058232 A | 6/2009 |
| KR | 10-2011-0131166 A | 12/2011 |

OTHER PUBLICATIONS

Gupta et al. "DFTL: a flash translation layer employing demand-based selective caching of pagelevel address mappings", Proceeding of the 14th international conference on Architectural support for programming languages and operating systems, 12 pages, Mar. 7-11, 2009; University Part, PA.

Lee et al., "LAST: locality-aware sector translation for NAND flash memory-based storage systems", ACM SIGOPS Operating Systems Review, 8 pages; v.42 n.6, Oct. 2008; Korea.

Meister et al. "Multi-level comparison of data deduplication in a backup scenario", Proceedings of SYSTOR 2009: The Israeli Experimental Systems Conference, May 4-Apr. 6, 2009; 12 pages.

* cited by examiner

Fig. 2

| Spatial Locality Information | | Historical Request Information | |
|---|---|---|---|
| ADDRESS | LENGTH | Number of Read RQ | Number of Write RQ | Etc. |

Fig. 10

| ADDRESS | LENGTH | Number of Read Request | Number of Write Request | Deduplication Information | Etc. |

STORAGE DEVICE AND DATA MANAGEMENT METHOD THEREOF

REFERENCE TO PRIORITY APPLICATION

A claim for priority under 35 U.S.C. §119 is made to Korean Patent Application No. 10-2012-0002547, filed Jan. 9, 2012 in the Korean Intellectual Property Office, the entire contents of which are hereby incorporated herein by reference.

FIELD

This invention relates to storage devices and data managing methods thereof.

BACKGROUND

A semiconductor memory device can be volatile (hereinafter, referred to as a volatile memory device) or nonvolatile (hereinafter, referred to as a nonvolatile memory device). A nonvolatile memory device retains contents stored therein even at power-off. Data stored in the nonvolatile memory device is permanent or reprogrammed according to the fabrication technology used. Nonvolatile memory devices are used for program and microcode storage in a wide variety of applications in the computer, avionics, telecommunications, and consumer electronics industries.

SUMMARY

One aspect of embodiments of the inventive concept is directed to provide a data managing method of a storage device which includes at least one nonvolatile memory device and a controller controlling the nonvolatile memory device. The data managing method includes receiving an input/output request and generating a section directing logical addresses based on the input/output request. The section is managed using section information, and the section information includes a start logical address corresponding to the input/output request, spatial locality information having the number of the directed logical addresses, and historical request information.

Another aspect of embodiments of the inventive concept is directed to providing a storage device that includes at least one nonvolatile memory device and a controller for controlling the at least one nonvolatile memory device. The controller includes a section management module generating a section directing logical addresses corresponding to an input/output request and a buffer storing data and section information of the section according to the input/output request. The section information includes spatial locality information directing the logical addresses and historical request information having a write request number and a read request number.

BRIEF DESCRIPTION OF THE DRAWINGS

The above and other objects and features will become apparent from the following description with reference to the following figures, wherein like reference numerals refer to like parts throughout the various figures unless otherwise specified, and wherein

FIG. 2 is a diagram describing section information according to an embodiment of the inventive concept.

FIG. 10 is a diagram describing section information to be applied to deduplication.

DETAILED DESCRIPTION

Embodiments will be described in detail with reference to the accompanying drawings. The inventive concept, however, may be embodied in various different forms, and should not be construed as being limited only to the illustrated embodiments.

Figure 1:
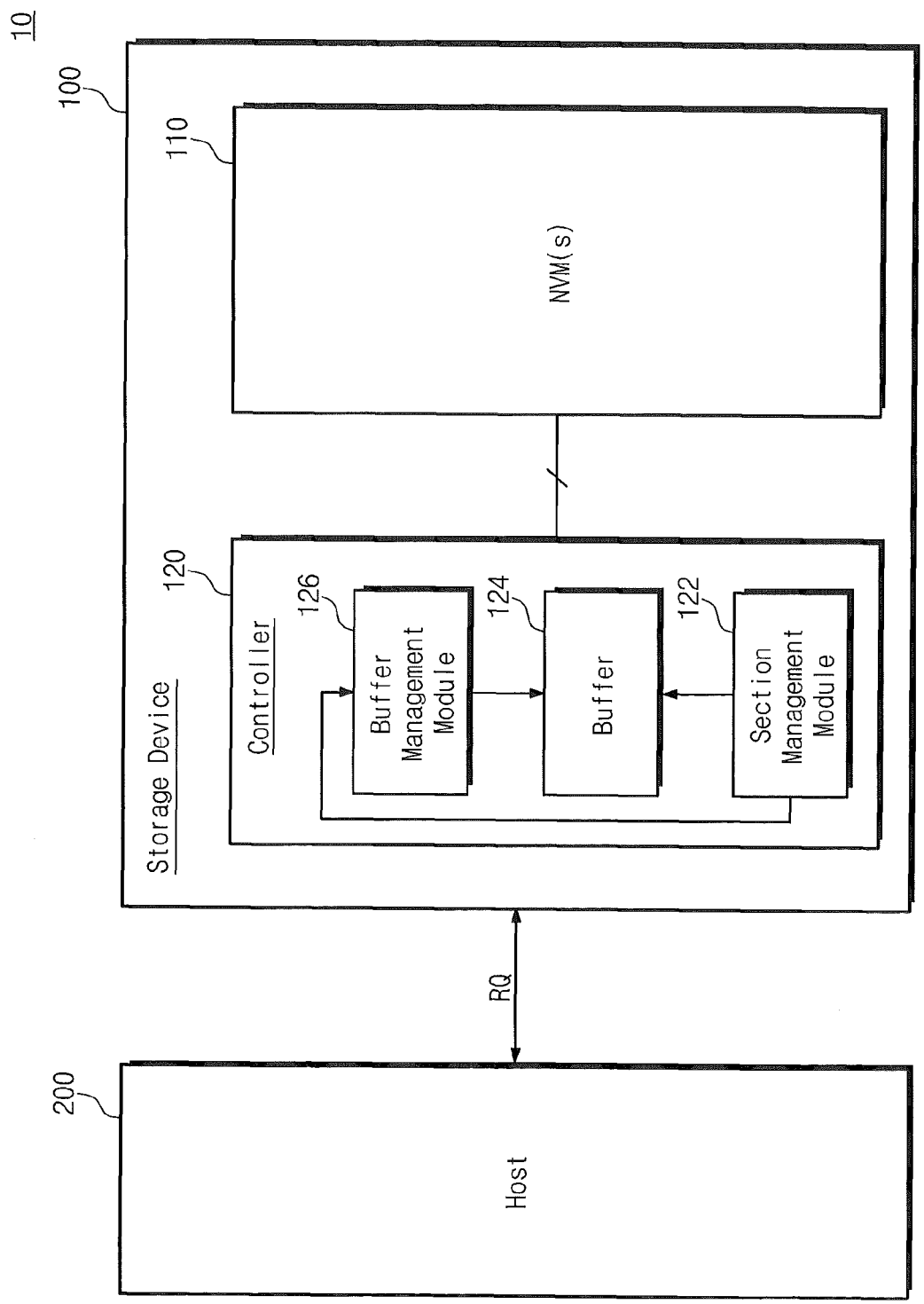
FIG. 1 is a block diagram schematically illustrating an electronic device including a storage device according to an embodiment of the inventive concept.

FIG. 1 is a block diagram schematically illustrating an electronic device including a storage device according to an embodiment of the inventive concept. Referring to FIG. 1, an electronic device 10 may include a storage device 100 and a host 200. The storage device 100 may perform a write operation or a read operation in response to an input/output request RQ. The storage device 100 may include at least one nonvolatile memory device 110 and a controller 120. The storage device 100 may be a solid state driver (SSD), a flash memory card, a multimedia card (MMC), an USB flash driver, a smartmedia, a compact flash, a memory stick, a secure digital card, a universal flash storage (UFS), or the like.

The nonvolatile memory device 110 may store data during a write operation and may read stored data during a read operation. The nonvolatile memory device 110 may be a NAND flash memory, a vertical NAND flash memory (or, referred to as VNAND or 3D), a NOR flash memory, a resistive random access memory (RRAM), a phase-change RAM (PRAM), a magnetroresistive RAM (MRAM), a ferroelectric RAM (FRAM), a spin transfer torque RAM (STT-RAM), or the like.

The controller 120 may control an overall operation of the nonvolatile memory device 110. The controller 120 may generate section directing logical addresses corresponding to the input/output request RQ. Herein, the section may be a logical address space according to the input/output request RQ, and a size of the section may be variable according to the input/output request RQ.

The controller 120 may include a section management module 122, a buffer 124, and a buffer management module 126. The section management module 122 may generate a section according to the input/output request RQ or may update section information for managing the section. Herein, the section information may include spatial locality information directing logical addresses corresponding to the input/output request RQ and historical request information associated with a history of the input/output request RQ. The historical request information may include a write request number, a read request number, and the like.

The buffer 124 may store read data corresponding to the input/output request RQ or section information generated from the section management module 122 according to the input/output request RQ. In example embodiments, the buffer 124 may be formed of a volatile memory device such as DRAM, SRAM, or the like. In other example embodiments, the buffer 124 can be formed of a nonvolatile memory device such as PRAM.

The buffer management module 126 may manage data stored in the buffer 124. For example, the buffer management module 126 may select and remove data to be deleted from the buffer 124. In example embodiments, the buffer management module 126 may delete data (hereinafter, referred to as section data) corresponding to a section stored in the buffer 124, based on section information generated from the section management module 122.

The host 200 may read or store data from or in the storage device 100 using the input/output request RQ. The host 200 may be connected with the storage device via an interface such as USB, SCSI, ESDI, SATA, SAS, PCI-express, or IDE interface.

The electronic device 10 may be a tablet PC, a personal/portable computer, a portable media player (PMP), a digital camera, a camcorder, or the like.

A conventional storage device may perform an input/output request rapidly by sizing and dividing characteristic and access pattern of data based on a constant randomly defined or a value obtained via a test. However, the conventional storage device may not size and divide characteristic and access pattern of data easily.

The storage device 100 according to the inventive concept may be configured to divide a logical address space into sections according to a spatial locality of an input/output request RQ, and may manage historic request information of the input/output request RQ by a section unit. Thus, it is possible to flexibly divide a logical address space according to the context (e.g., an input/output request) at a file system level and to easily discriminate associated data from the divided logical address space, that is, a section.

FIG. 2 is a diagram describing section information according to an embodiment of the inventive concept. Referring to FIG. 2, section information may include spatial locality information and historical request information. The spatial locality information may include a logical address indicating a start point of a section and a length indicating a logical address number corresponding to a section size. The historical request information may include the number of read requests and the number of write requests. The section information may further include information for data management.

Figure 3:
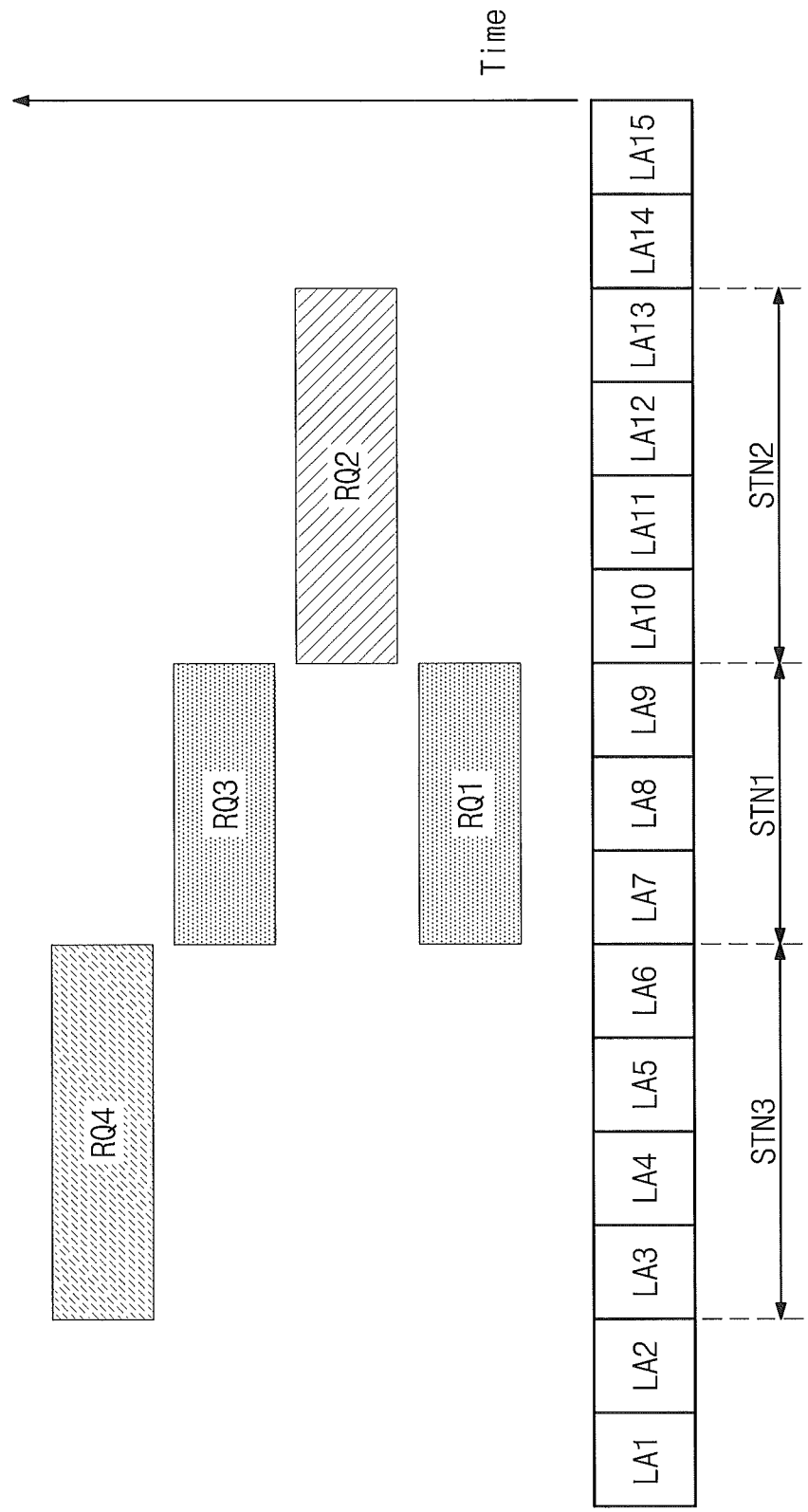
FIG. 3 is a diagram describing a section generating method according to an embodiment of the inventive concept.

FIG. 3 is a diagram describing a section generating method according to an embodiment of the inventive concept. Referring to FIG. 3, a section may be generated according to an input/output request. Below, there will be described a method of generating sections STN1 to STN3 when first to fourth input/output requests RQ1 to RQ4 are sequentially provided to a storage device 100 from a host 200. When receiving the first input/output request RQ1, a section management module 122 of the storage device 100 may generate a first section STN1. The first section STN1 may be a logical address space from a seventh logical address LA7 to a ninth logical address LA9. When receiving the second input/output request RQ2, the section management module 122 may generate a second section STN2. The second section STN2 may be a logical address space from a tenth logical address LA10 to a thirteenth logical address LA13. When receiving the third input/output request RQ3, the section management module 122 may not generate a section. This may be because a section corresponding to the third input/output request RQ3 is equal to the first section STN1 being previously generated.

Although not shown in FIG. 3, in the event that a section is partially overlapped with a previously generated section, the section management module 122 may generate a new section when a currently received input/output request is different from a previously received input/output request. This may be because correlation between data of a previously generated section and data of a newly generated section is judged to be less.

When receiving the fourth input/output request RQ4, the section management module 122 may generate a fourth section STN4. The fourth section STN4 may be a logical address space from a third logical address LA3 to a sixth logical address LA6.

In FIG. 3, there is illustrated an example that three sections STN1 to STN3 are generated according to four input/output requests RQ1 to RQ4.

An input/output request provided to the storage device 100 from a host 200 can be merged with another input/output request. For example, when an address space is continuous regardless of correlation of data, the host 200 may merge different input/output requests into one input/output request. With the inventive concept, it is possible to generate divided sections corresponding to original input/output requests upon a merged input/output request.

Figure 4:
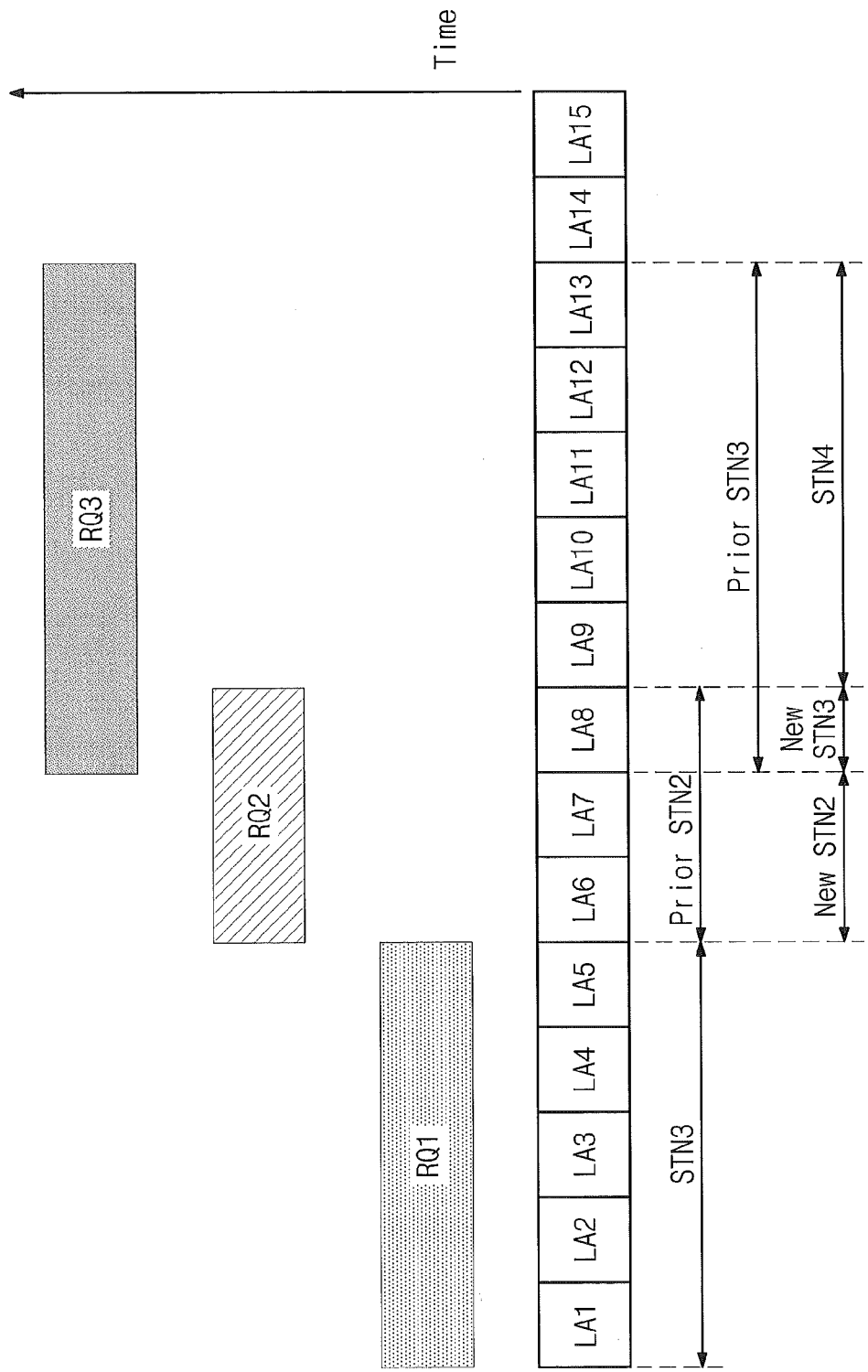
FIG. 4 is a diagram describing a method of dividing a merged input/output request and managing data according to different sections.

FIG. 4 is a diagram describing a method of dividing a merged input/output request and managing data according to different sections. Referring to FIG. 4, three sections STN1, Prior STN2, Prior STN3 may be generated in response to three input/output requests RQ1, RQ2, and RQ3. Herein, it is assumed that a second input/output request RQ2 is a merged input/output request.

As illustrated in FIG. 4, an address space LA8 may be overlapped between a second input/output request RQ1 and a third input/output request RQ3. A section management module 122 may generate a new second section New STN2 obtaining by subtracting the address space LA8, overlapped between the second input/output request RQ1 and the third input/output request RQ3, from a second section Prior STN2 being a previous section, a new section New STN3 corresponding to the address space LA8 overlapped between the second input/output request RQ1 and the third input/output request RQ3, and a fourth section STN4 obtained by subtracting the address space LA8, overlapped between the second input/output request RQ1 and the third input/output request RQ3, from a third section Prior STN3 being a previous section. The previous second section Prior STN2 according to a merged input/output request RQ2 may be divided into sections New STN2 and New STN3.

In example embodiments, historical request information (e.g., the number of write requests or the number of read requests) of a new section New STN3 may reflect historical request information (e.g., the number of write requests or the number of read requests) corresponding to an input/output request RQ3 onto historical request information (e.g., the number of write requests or the number of read requests) corresponding to a previous section Prior STN2. For example, historical request information corresponding to a previous section Prior STN2 may include two write requests and four read requests. If a third input/output request RQ3 is a write request, historical request information corresponding to a new section New STN3 may include three write requests and four read requests.

With a section management method of the inventive concept, it is possible to partition a section corresponding to a merged input/output request.

In FIG. 4, there is illustrated an example that a previous third section Prior STN3 generated according to a third input/output request RQ3 is divided into two sections New STN3 and STN4. With a section management method of the inventive concept, it is possible to merge the divided sections again.

Figure 5:
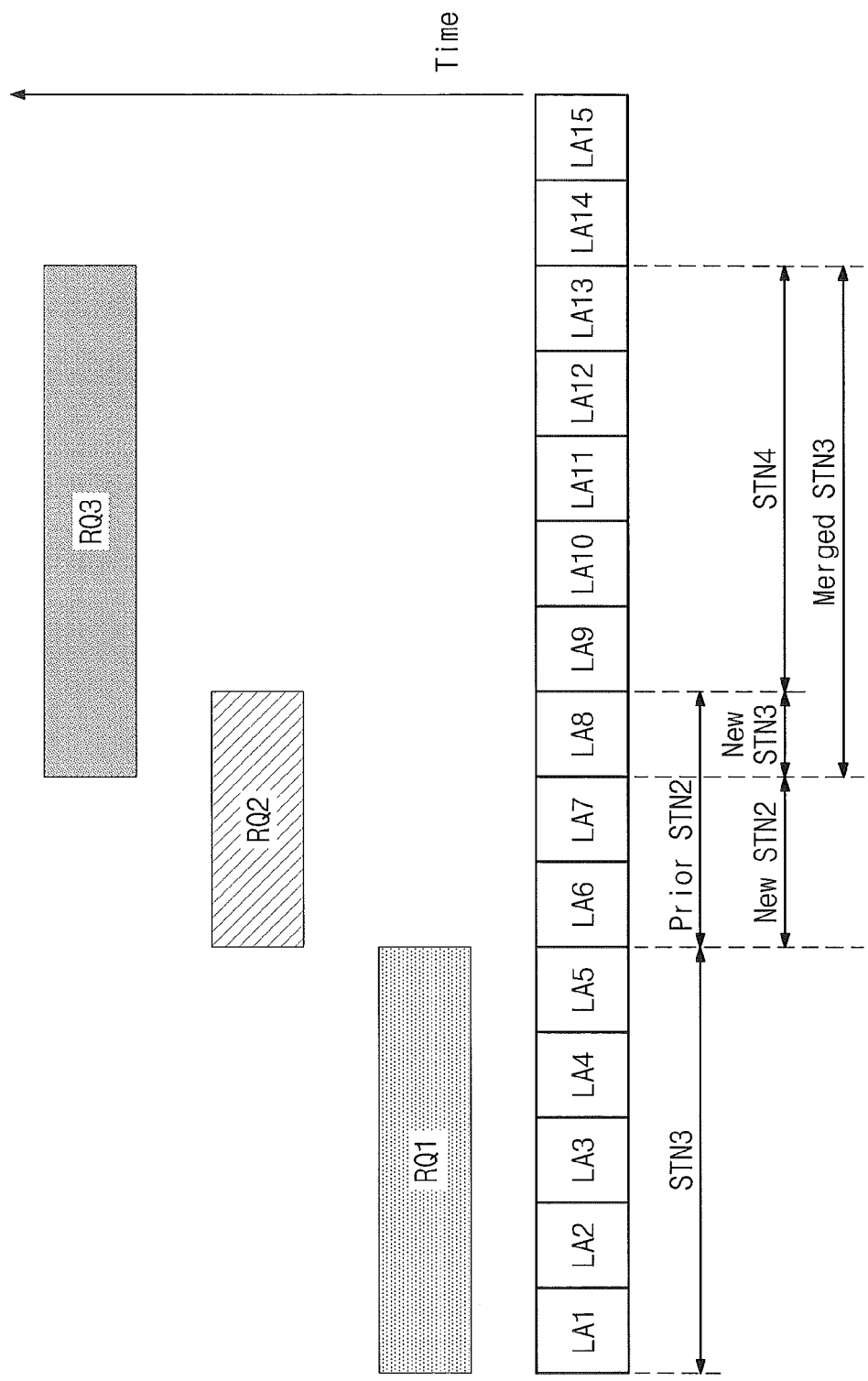
FIG. 5 is a diagram describing a method of merging sections divided according to an embodiment of the inventive concept.

FIG. 5 is a diagram describing a method of merging sections divided according to an embodiment of the inventive concept. Referring to FIG. 5, as a section New STN3 corresponding to an overlapped address space LA8 is newly added, four sections may be generated to correspond to three input/output requests RQ1, RQ2, and RQ3. Afterwards, when a storage device 100 is in an idle state, a section management module 122 may judge merging of divided sections whose addresses are continuous. If merging is requested, the section management module 122 may merge sections.

For example, as for sections New STN3 and STN4 corresponding to a third input/output request RQ3, if the number of read requests is equal to the number of write requests, the section management module 122 may generate a merged section Merged STN3 by merging the sections New STN3 and STN4.

Whether actual data is shifted at merging of the sections New STN3 and STN4 may be decided as follows. First, when data corresponding to the sections New STN3 and STN4 before merging exists at discontinuous physical spaces, data may be shifted such that it exists at continuous physical spaces during a merge operation. Second, when data is managed by a mapping table according to a section, no data may be shifted. Accordingly, a section management method according to the inventive concept may merge divided sections.

Figure 6:
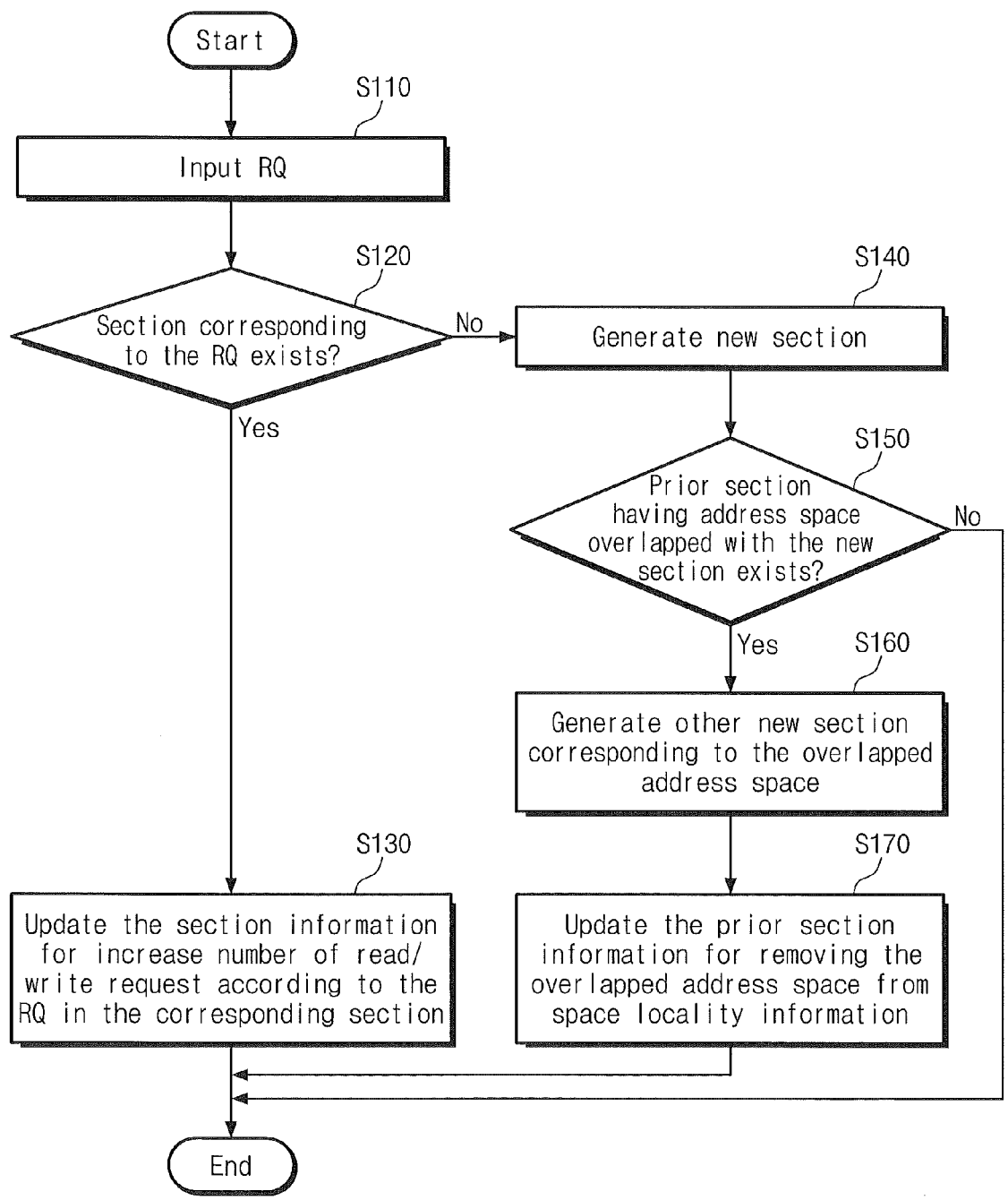
FIG. 6 is a flowchart describing a section registering method according to an embodiment of the inventive concept.

FIG. 6 is a flowchart describing a section registering method according to an embodiment of the inventive concept. A section registering method will be more fully described with reference to FIGS. 1 to 6. In operation S110, an input/output request RQ may be sent to a controller 120 of a storage device 100 from a host 200. The input/output request RQ may be one of a write request and a read request. In operation S120, a section management module 122 may analyze the received input/output request RQ to judge whether a section corresponding to the input/output request RQ exists. If a section corresponding to the input/output request RQ exists, in operation S130, the section management module 122 may update section information such that a write request number or a read request number increases according to the input/output request RQ. Afterwards, section registration may be ended. In the event a section corresponding to the input/output request RQ does not exist, in operation S140, the section management module 122 may generate a new section. In operation S150, the section management module 122 may judge whether the new section is partially overlapped with a previous section. When the new section is not partially overlapped with a previous section, section registration may be ended.

When the new section is partially overlapped with a previous section, in operation S160, the section management module 122 may generate another new section corresponding to an overlapped address space. Herein, a new section may be generated according to a method described in relation to FIGS. 4 and 5. Afterwards, in operation S170, the section management module 122 may update section information of the previous section such that an overlapped address space is removed from spatial locality information. Then, section registration may be ended. Accordingly, with the section registering method of the inventive concept, it is possible to generate a section corresponding to an input/output request RQ and to generate divided sections with respect to sections partially overlapped.

Figure 7:
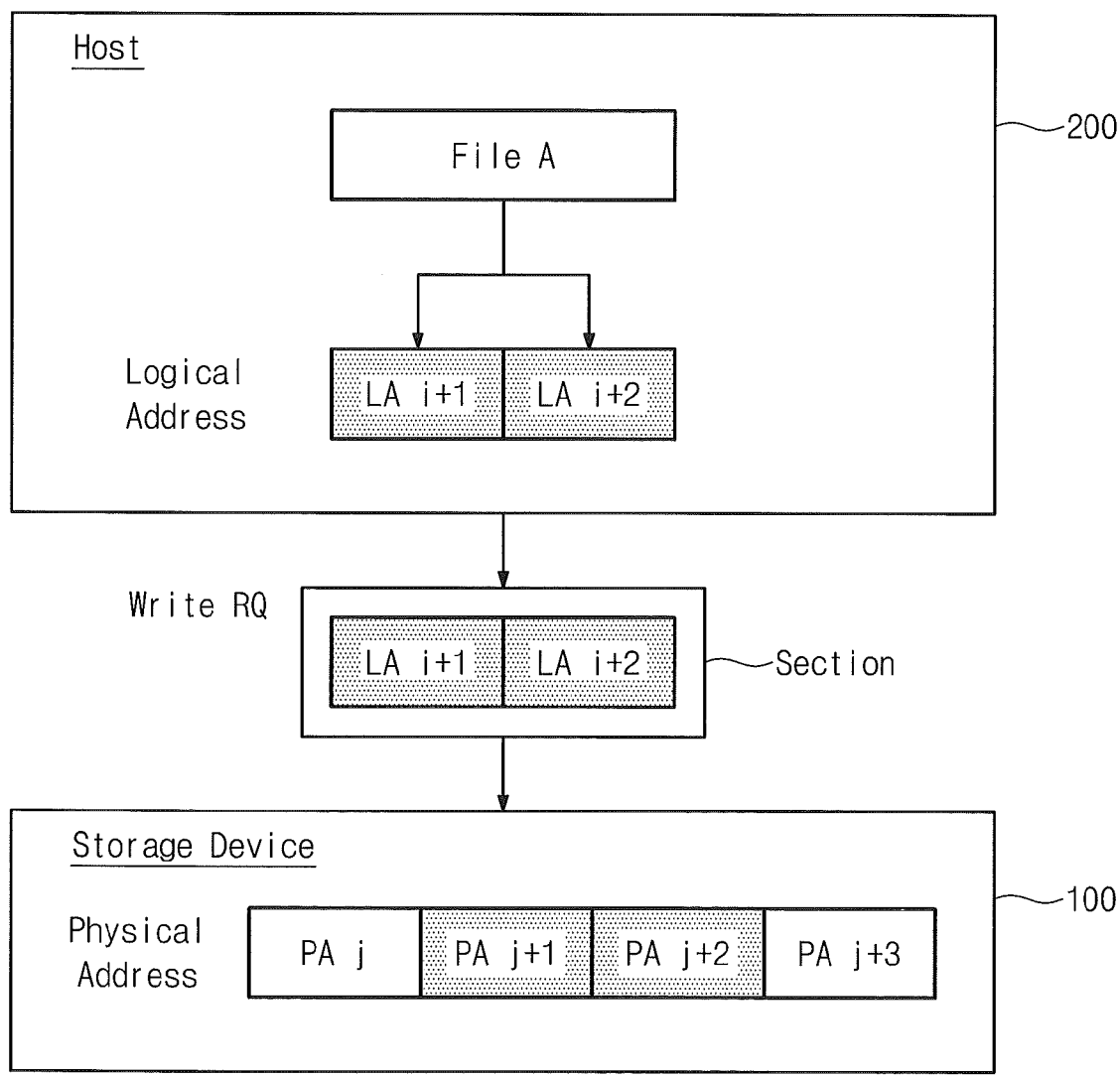
FIG. 7 is a diagram describing a file storing method according to an embodiment of the inventive concept.

FIG. 7 is a diagram describing a file storing method according to an embodiment of the inventive concept. A file storing method will be described with reference to FIGS. 1 to 7. A file system of a host 200 may manage a file A such that logical addresses LAi+1 and LA i+2 are assigned to the file A. The host 200 may send the file A mapped by a section unit to a storage device 100 using a write request. The file A sent to the storage device 100 may be stored in physical spaces corresponding to physical addresses PAj+1 and PAj+2, respectively. In example embodiments, a write request can be merged with other input/output requests since writing is performed asynchronously.

Figure 8:
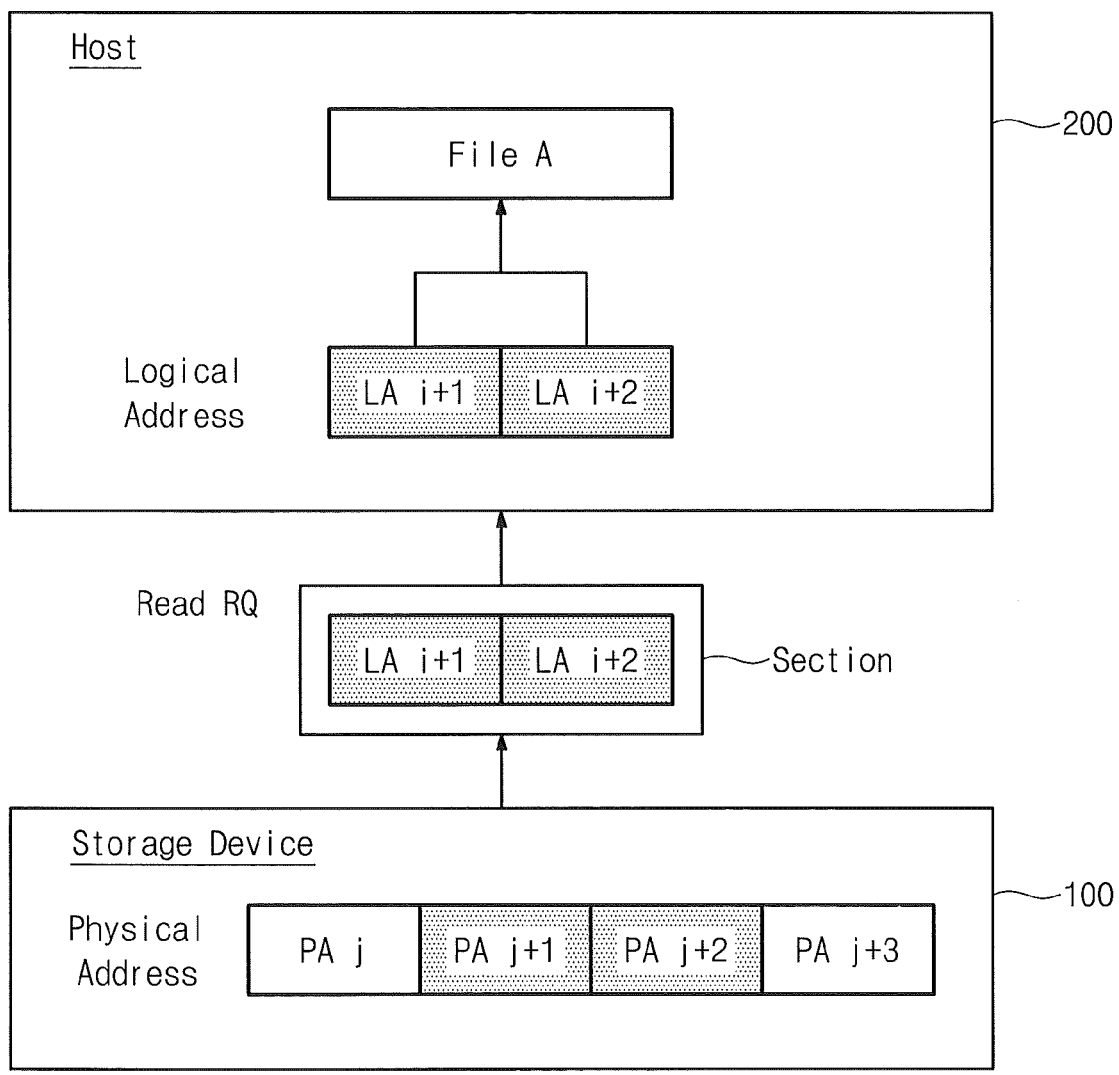
FIG. 8 is a diagram describing a file reading operation according to an embodiment of the inventive concept.

FIG. 8 is a diagram describing a file reading operation according to an embodiment of the inventive concept. A file reading operation will be described with reference to FIGS. 1 to 8. A file system of a host 200 may provide a storage device 100 with a read request associated with logical addresses LAi+1 and LAi+2 to read a file A. Unlike a write request, a read request may be sent to the storage device 100 at a state where merging of input/output requests is minimized. This may be to escape a delay. For this reason, correlation between data stored in logical address spaces may be discriminated from the fact that a read operation and a write operation are performed with respect to specific logical address spaces.

A section management module 122 may check historical request information (e.g., the number of read requests and the number of write requests) of a section corresponding to the read request, and may infer that logical addresses LAi+1 and LAi+2 are associated addresses. When the number of read requests and the number of write requests at a specific address period, that is, a section is over a reference value, the section management module 122 may judge data within a section to be associated with each other.

Reading of data from physical addresses PAj+1 and PAj+2 may be performed differently according to the judgment of the section management module 122. For example, in the event that the physical addresses PAj+1 and PAj+2 are associated, data stored in the storage device 100 may be read using a pre-fetch operation. On the other hand, in the event that the physical addresses PAj+1 and PAj+2 are not associated, data stored in the storage device 100 may be read using a normal read operation. The read data may be sent to the host 200 by a section unit.

Figure 9A:
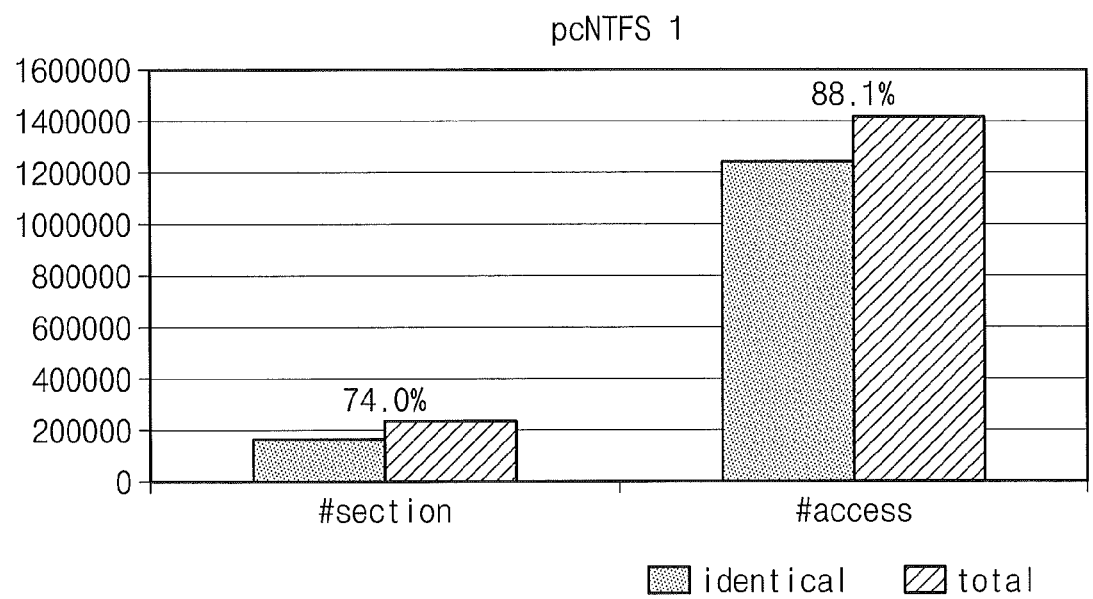
FIGS. 9A to 9D are diagrams illustrating a test result indicating how to discriminate an identified section.
Figure 9B:
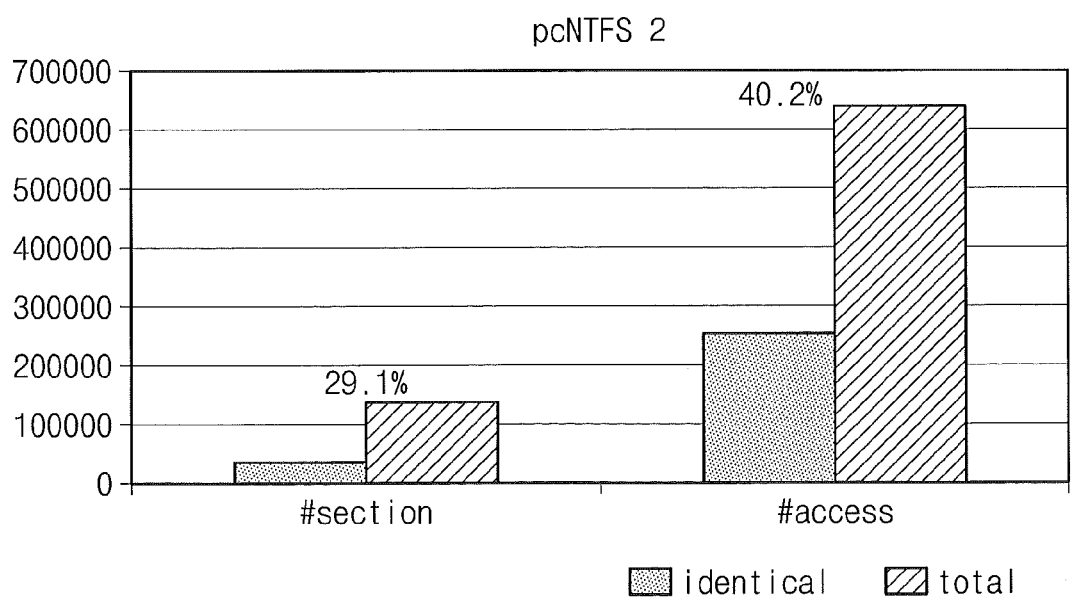
Figure 9C:
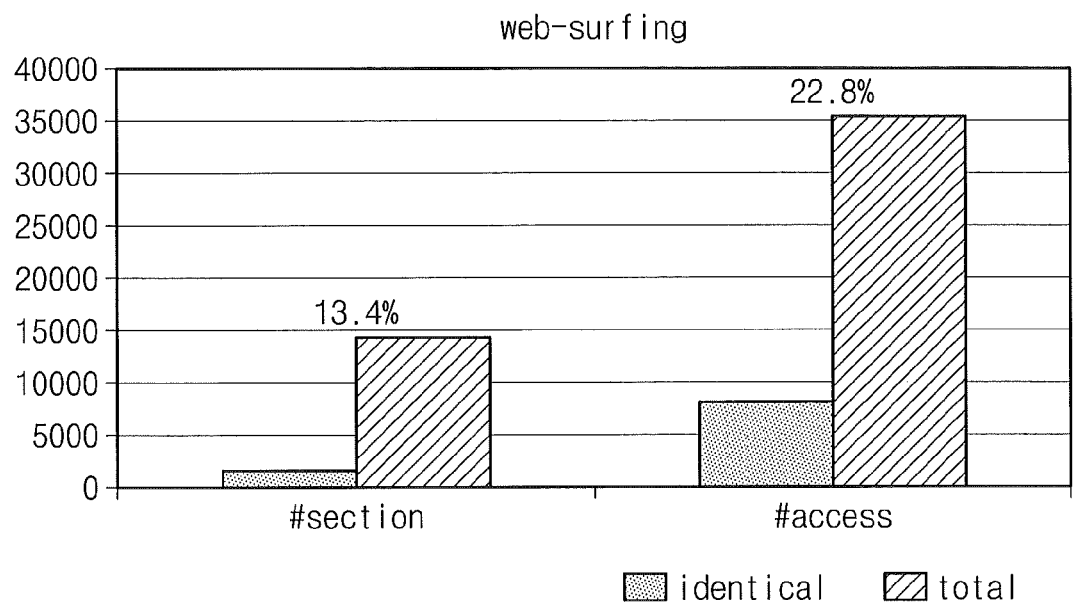
Figure 9D:
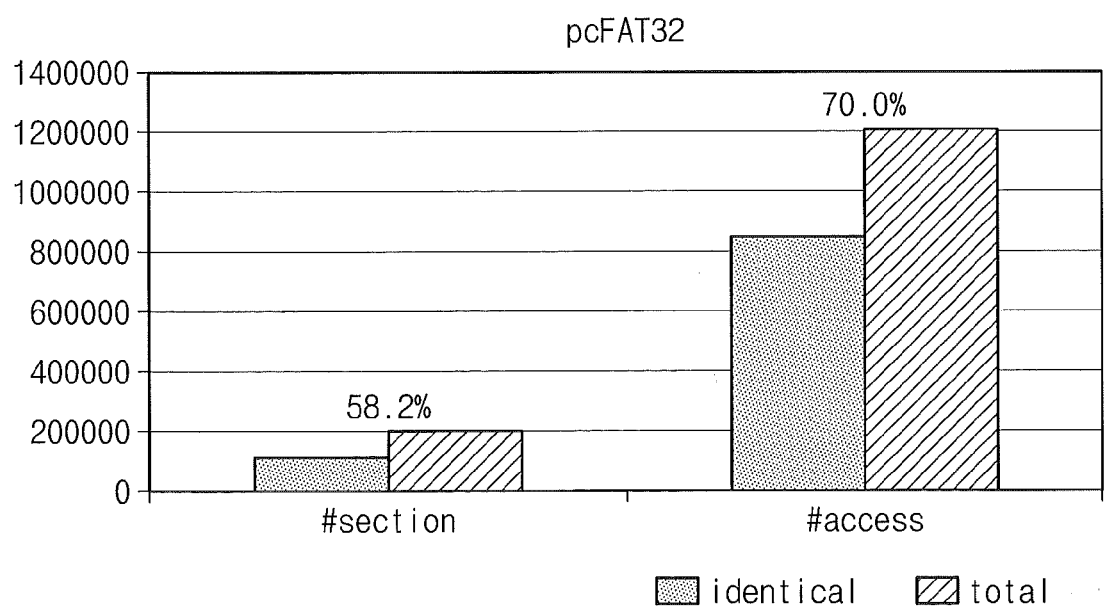

FIGS. 9A to 9D are diagrams illustrating a test result indicating how to discriminate an identified section. FIGS. 9A and 9B are related to a trace pcNTFS1 and pcNTFS2 obtained via various works of an NTFS file system. FIG. 9C is related to a web surfing trace obtained via web-surfing. FIG. 9D is related to a trace pcFAT32 obtained via various works of a FAT32 file system. In these figures, a Y axis may indicate a number, # section may indicate a section number, # access may indicate a sum of input/output requests generated at sections, "identical" may indicate an identified section, and "total" may indicate a total section.

Referring to FIG. 9A, in case of the trace pcNTFS1, about 74% of a total section may be discriminated to be an identified section, and an access ratio may be about 88.1% of a total access. Referring to FIG. 9B, in case of the trace pcNTFS2, an identified section may be relatively less due to many random access. Referring to FIG. 9C, in case of web-surfing, an identified section may be discriminated relatively less due to many random access. Referring to FIG. 9D, in case of the trace pcFAT32, about 58.2% of a total section may be discriminated to be an identified section. Herein, an input/output access may occupy about 70%.

Whether a read request number and a write request number are over a reference value or not may be unimportant according to application fields. For example, whether logical address periods of sections are continuous and whether a read request number is equal to a write request number can be used to analyze continuity of sections. For this reason, whether a read request number and a write request number are over a reference value or not may be unimportant. An access period of an input/output request may be limited according to a file system. Although multiple input/output requests are generated to access a file, an access number may be identical. Thus, the continuity of sections may be sufficiently judged based on whether logical address periods of sections are continuous (e.g., spatial locality information) and whether a read request number is equal to a write request number (historical request information). The continuity of data judged with respect to identified sections may be more reliable compared with continuity of unidentified sections. Thus, whether to utilize any sections may be selected variously according to an application field.

Below, data management method of a storage device using a section generated according to the inventive concept will be more fully described. A section according to the inventive concept is applicable to deduplication. In the event that write-requested data is equal to previously stored data, the previously stored data may be referred while the write-requested data is not stored in duplicate. When using deduplication, a storage device 100 may store changed contents of a file during a data backup operation, so that a storage space is remarkably reduced. An example of deduplication is disclosed in KR Patent Application No. 2011-0131166, the entire contents of which are herein incorporated by reference.

FIG. 10 is a diagram describing section information to be applied to deduplication. Referring to FIG. 10, section information may further include deduplication information compared with section information illustrated in FIG. 2. In example embodiments, the deduplication information may be a deduplication ratio of a section. Herein, the deduplication ratio may be a ratio of an address space having deduplicated data to a total address space of a section. The deduplication ratio may be stored in an identified section.

In other example embodiments, the deduplication information may be the number of logical addresses having deduplicated data. In this case, the deduplication ratio may be calculated by a ratio of the number of logical addresses having deduplicated data to the number of total logical addresses of a section. A storage device 100 may decide whether to make deduplication instantly or later based on the deduplication ratio. To make deduplication instantly may be known as terms "in-line processing", "foreground job, and "on-the-fly job". To make deduplication later may be known as terms "out-of-line processing", and "background job".

Although not shown, a controller 120 of the storage device 100 may include a deduplication module that makes deduplication according to section information. The deduplication module may decide whether to make deduplication instantly or later based on the deduplication ratio of a section from a section management module 122.

In example embodiments, in case of deduplication, data of a predetermined unit and data of a predetermined unit of a section may be judged to be equal when a hash value of data of a predetermined unit stored in at least one nonvolatile memory device 110 is equal to a hash value of data of a predetermined unit from among data corresponding to a section. In other example embodiments, deduplication may be made using a BSW (basic sliding window) algorithm. The BSW (basic sliding window) algorithm may calculate a hash value of data while a window corresponding to data of a predetermined unit is being shifted in one direction. Accordingly, an embodiment of the inventive concept may process deduplication based on deduplication information included in a section.

Figure 11:
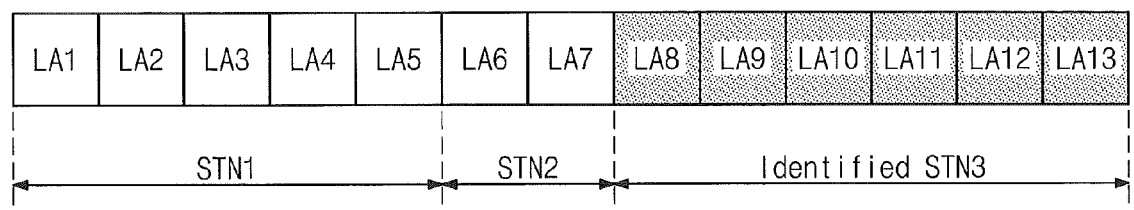
FIG. 11 is a diagram illustrating a section for describing deduplication.

FIG. 11 is a diagram illustrating a section for describing deduplication. Referring to FIG. 11, three sections STN1, STN2, and STN3 may exist, and a third section may be an identified section. The identified section may be a section experiencing deduplication.

Figure 12:
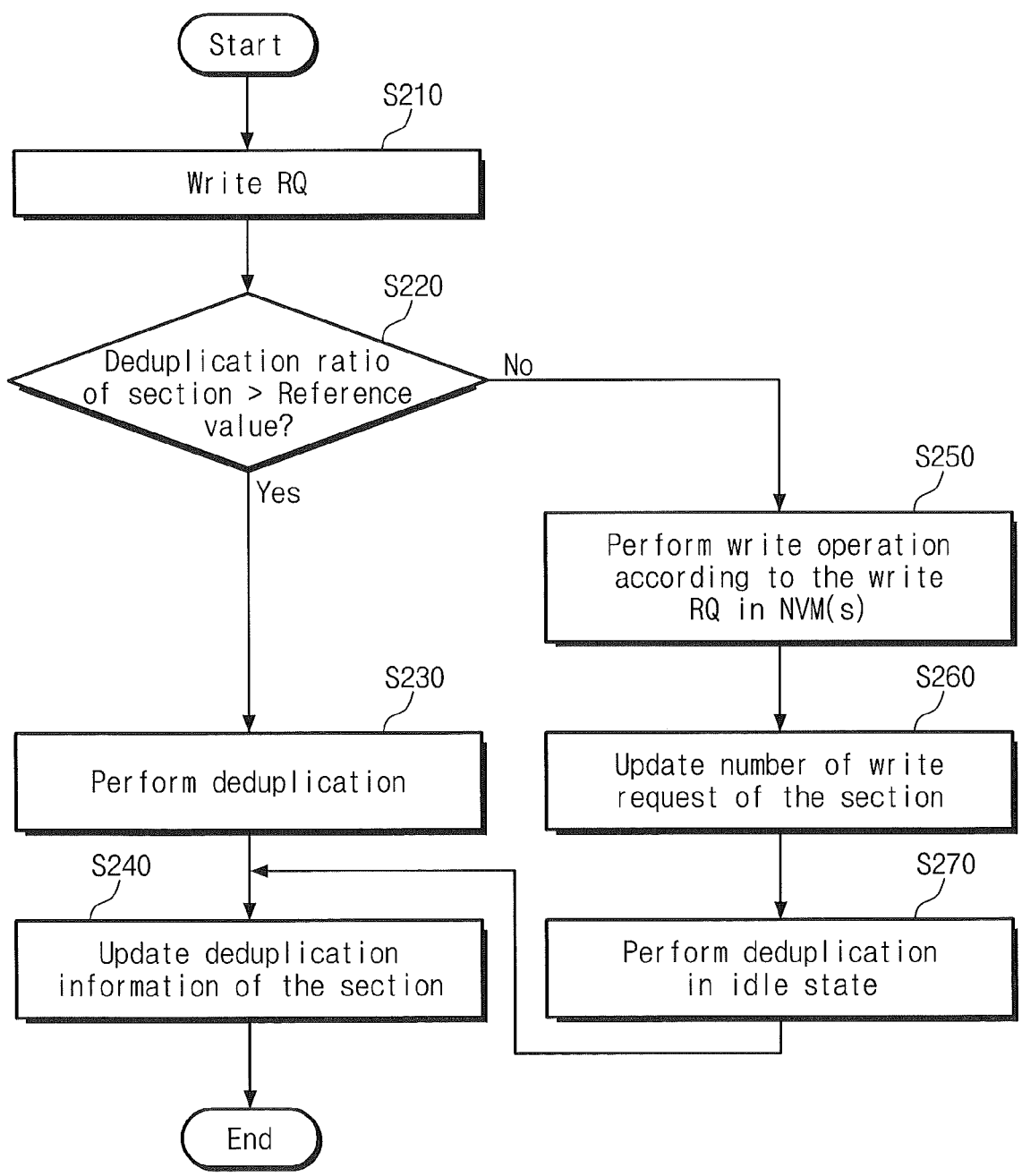
FIG. 12 is a flowchart illustrating a deduplication method according to an embodiment of the inventive concept.

FIG. 12 is a flowchart illustrating a deduplication method according to an embodiment of the inventive concept. A deduplication method will be described with reference to FIGS. 1 to 12. In operation S210, a write request may be sent to a storage device 100 from a host 200. In operation S220, a section management module 122 may judge whether a deduplication ratio of a write-requested section is larger than a reference value. If a deduplication ratio of a write-requested section is larger than the reference value, in operation S230, deduplication may be made instantly.

If a deduplication ratio of a write-requested section is smaller than the reference value, in operation S250, a write operation of a nonvolatile memory device 110 may be performed according the write request. Afterwards, in operation S260, a write request number of a section may be updated. When the storage device 100 is at an idle state, in operation S280, deduplication may be made via scanning of stored data. Then, the method proceeds to operation S240.

The deduplication method in FIG. 12 is described under the assumption that a section corresponding to a write request exists. However, the inventive concept is not limited thereto. For example, the deduplication method of the inventive concept may further include judging whether a section corresponding to a write request exists and generating a section corresponding to the write request when a section corresponding to a write request does not exist. With the above-described deduplication method, whether to make deduplication instantly or at an idle state may be decided based on a deduplication ratio of a section. It is possible to selectively perform deduplication in view of the spatial locality of an input/output request. The deduplication method of the inventive concept may improve deduplication efficiency by performing deduplication using a deduplication ratio of a section.

Figure 13:
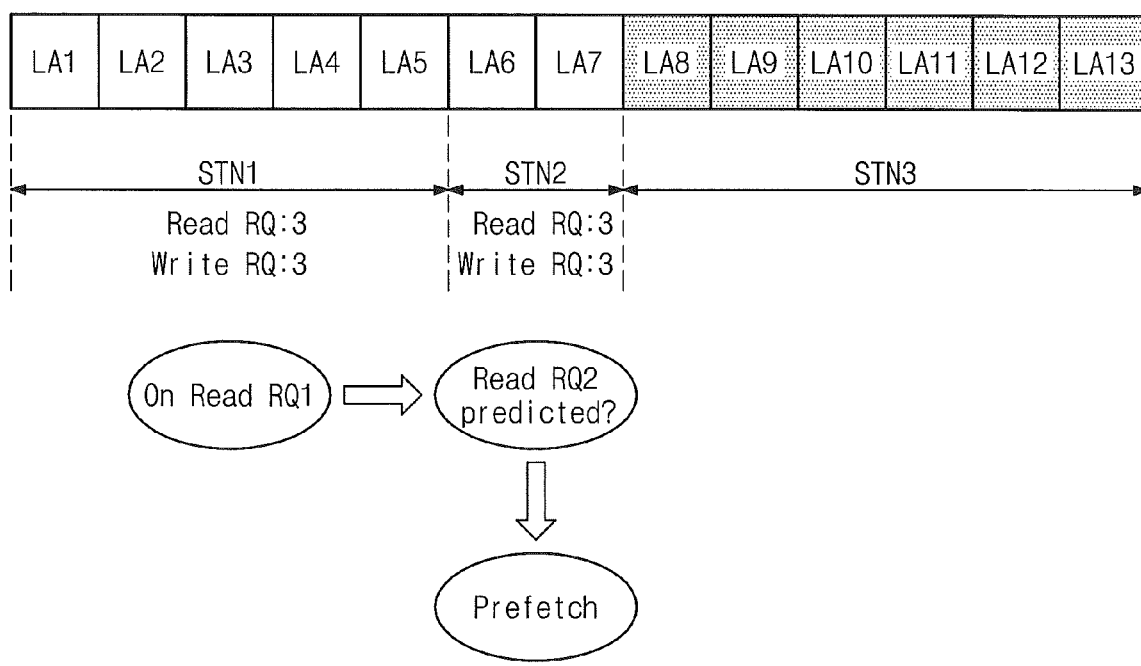
FIG. 13 is a diagram describing pre-fetch according to the inventive concept.

FIG. 13 is a diagram describing pre-fetch according to another embodiment of the inventive concept. Referring to FIG. 13, three sections STN1, STN2, and STN3 may exist. Upon a read request on a first section STN1, data corresponding to a second section STN2 may be pre-fetched when a read request of the second section STN2 is predicted. When a read request of a section is expected, spatial locality information and historical request information of each section may be used. For ease of description, it is assumed that a first section STN1 and a second section STN2 are continuous physically, that each of a read request number and a write request number of the first section STN1 is 3, and each of a read request number and a write request number of the second section STN2 is 3.

In view of facts that address spaces of the first and second sections STN1 and STN2 are continuous and that their historical request information is equal to each other, if a read request of the first section STN1 is received, there may be predicted that a read request of the first section STN1 is received. For this reason, corresponding data may be pre-fetched. Thus, an embodiment of the inventive concept may perform pre-fetch based on section information (e.g., spatial locality information and historical request information).

Figure 14:
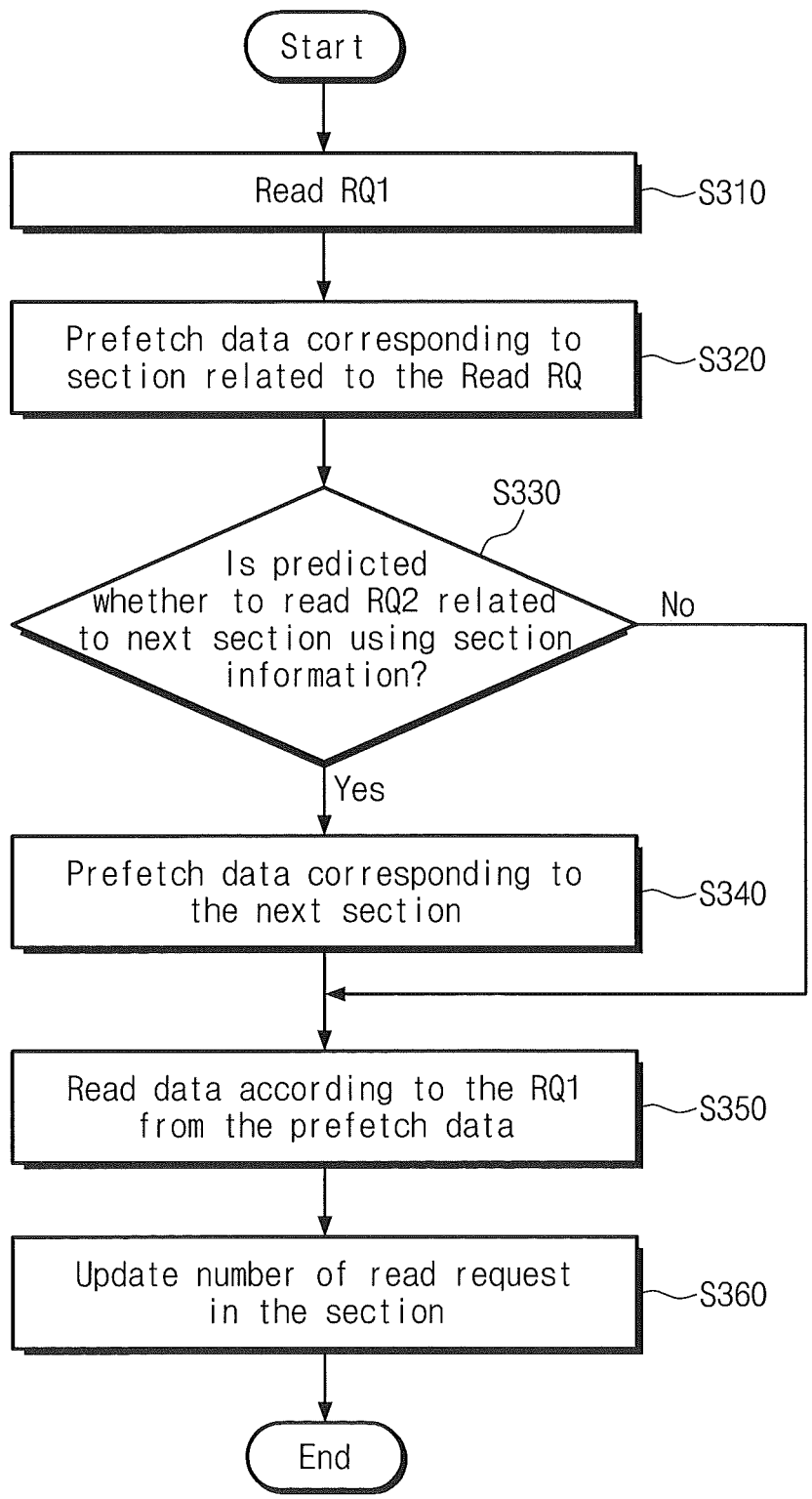
FIG. 14 is a flowchart describing a pre-fetch method according to an embodiment of the inventive concept.

FIG. 14 is a flowchart describing a pre-fetch method according to an embodiment of the inventive concept. Below, a pre-fetch method will be described with reference to FIGS. 1 to 9, 13, and 14. In operation S310, a read request may be sent to a storage device 100 from a host 200. In operation S320, data corresponding to a section associated with the read request may be pre-fetched. In operation S330, a section management module 122 may predict whether a read request of a next section is received, based on section information. When the read request of the next section is predicted, in operation S340, data of the next section may be pre-fetched. Then, the method proceeds to operation S350. When the read request of the next section is not predicted, the method proceeds to operation S350. In operation S350, read-requested data may be read from the pre-fetched data. In operation S360, a read request number of a section may be updated.

The pre-fetch method in FIG. 14 is described under the assumption that a section corresponding to a read request exists. However, the inventive concept is not limited thereto. The pre-fetch method of the inventive concept may further comprise judging whether a section corresponding to a read request exists and generating a section corresponding to a read request when a section corresponding to a read request does not exist. With the above-described pre-fetch method of the inventive concept, it is possible to rapidly process a read request to be issued later by performing pre-fetch via prediction of a read request of a next section based on section information.

Figure 15:
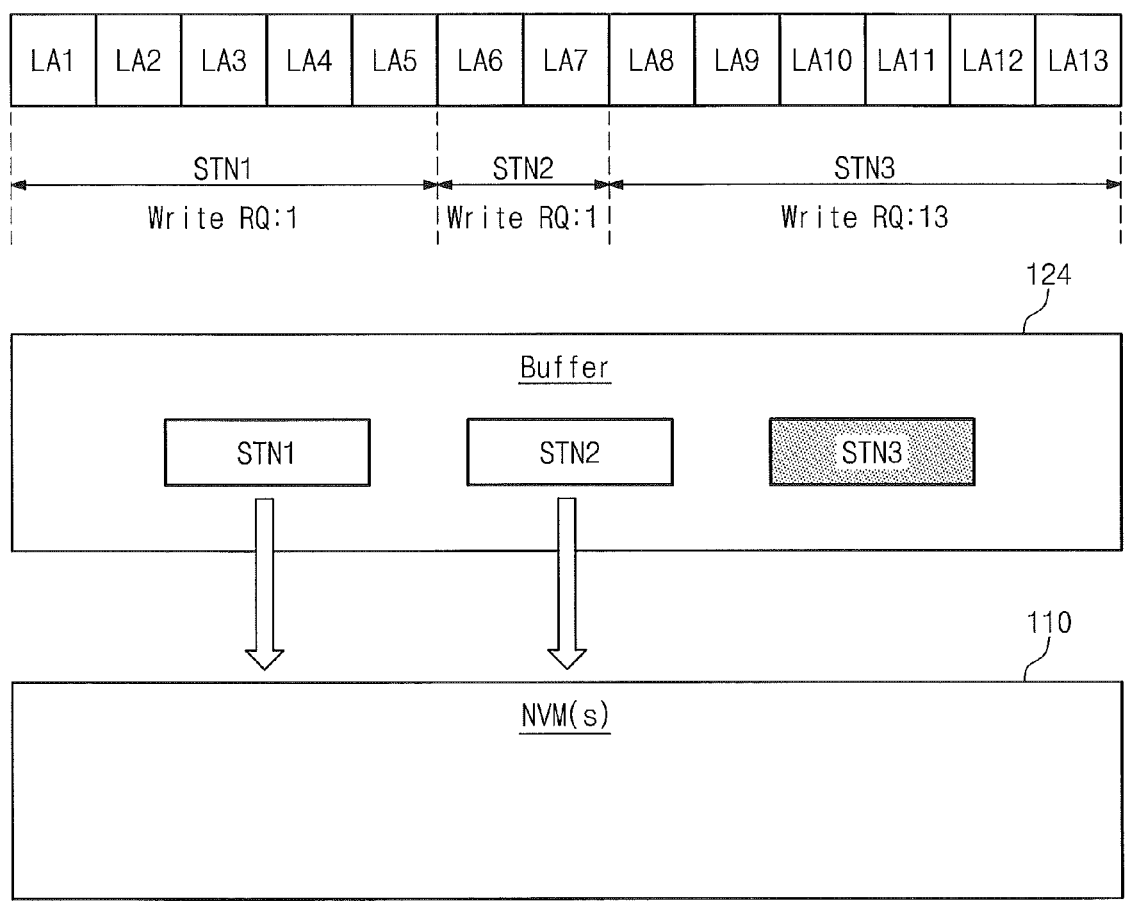
FIG. 15 is a diagram describing buffer management according to an embodiment of the inventive concept.

FIG. 15 is a diagram describing buffer management according to another embodiment of the inventive concept. Referring to FIG. 15, it is assumed that data corresponding to three sections STN1, STN2, and STN3 is stored in a buffer 124, that a write request number of each of first and second sections STN1 and STN2 is 1, and that a write request number of a third section STN3 is 3. When data needs be deleted from the buffer 124, a buffer management module 126 may first store data of sections (e.g., STN1 and STN2) having a small write request number from among the sections STN1, STN2, and STN3 of a section management module 122, in a nonvolatile memory device 110, and then may delete section data from the buffer 124. In the event data of the first and second sections STN1 and STN2 is previously stored in the nonvolatile memory device 110, the buffer management module 126 may delete data of the sections STN1 and STN2 from the buffer 124. In this manner, buffer management using section information may be performed.

Figure 16:
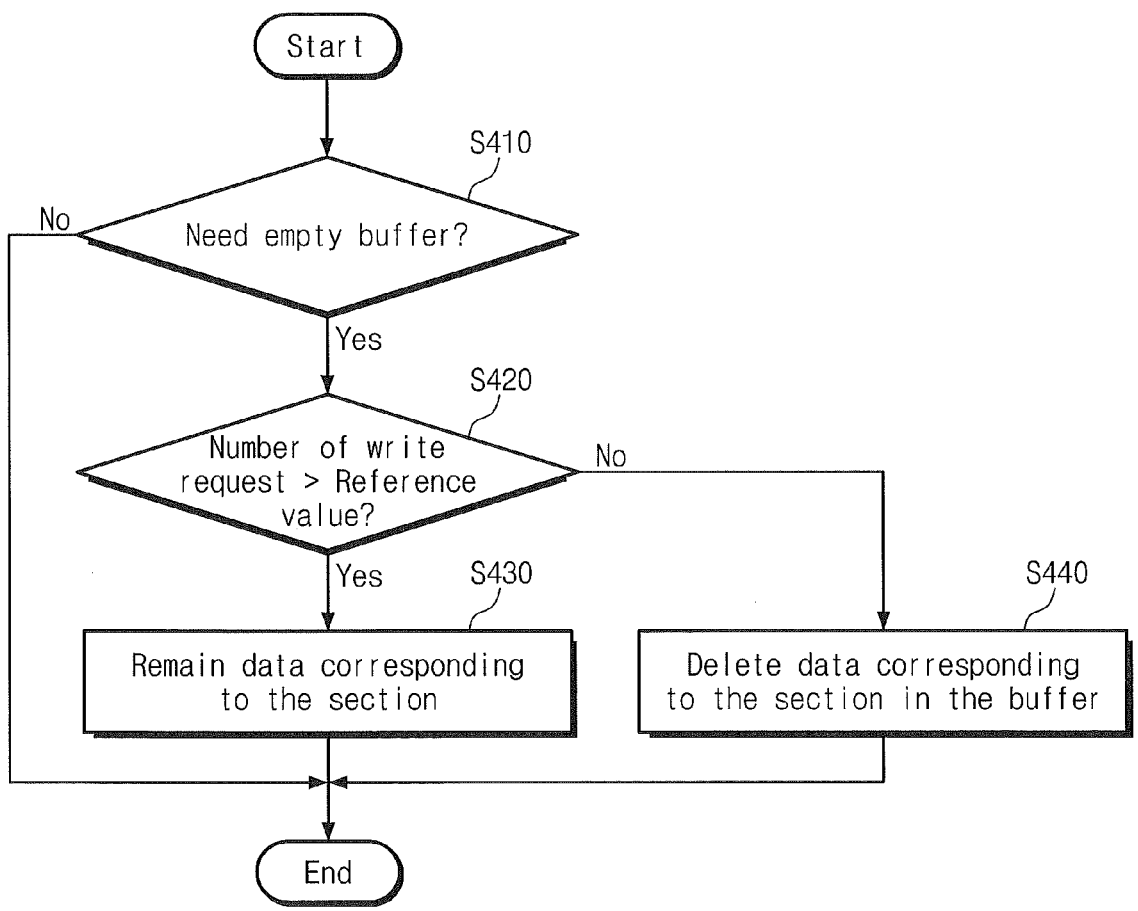
FIG. 16 is a flowchart describing a buffer managing method according to an embodiment of the inventive concept.

FIG. 16 is a flowchart describing a buffer managing method according to an embodiment of the inventive concept. Below, a buffer managing method will be described with reference to FIGS. 1 to 8, 15, and 16. In operation S410, a buffer management module 126 may judge whether to need to empty a buffer 124. If not, the method may be ended. If so, in operation S420, the buffer management module 126 may judge whether a write request number is larger than a reference value, based on section information transferred from a section management module 122.

When a write request number is larger than a reference value, in operation S430, section data in the buffer 124 may not be deleted. Afterwards, the method may be ended. When a write request number is smaller than a reference value, section data in the buffer 124 may be deleted. Afterwards, the method may be ended. Thus, with the buffer management method of the inventive concept, it is possible to delete section data in the buffer 124 based on a write request number.

An example that buffer management is performed according to a write request number is described with reference to FIGS. 15 and 16. However, the inventive concept is not limited thereto. It is possible delete section data in the buffer 124 according to a read request number. Thus, it is possible to manage data in the buffer 124 based on section information, which may be stored in a nonvolatile memory device in table format.

Figure 17:
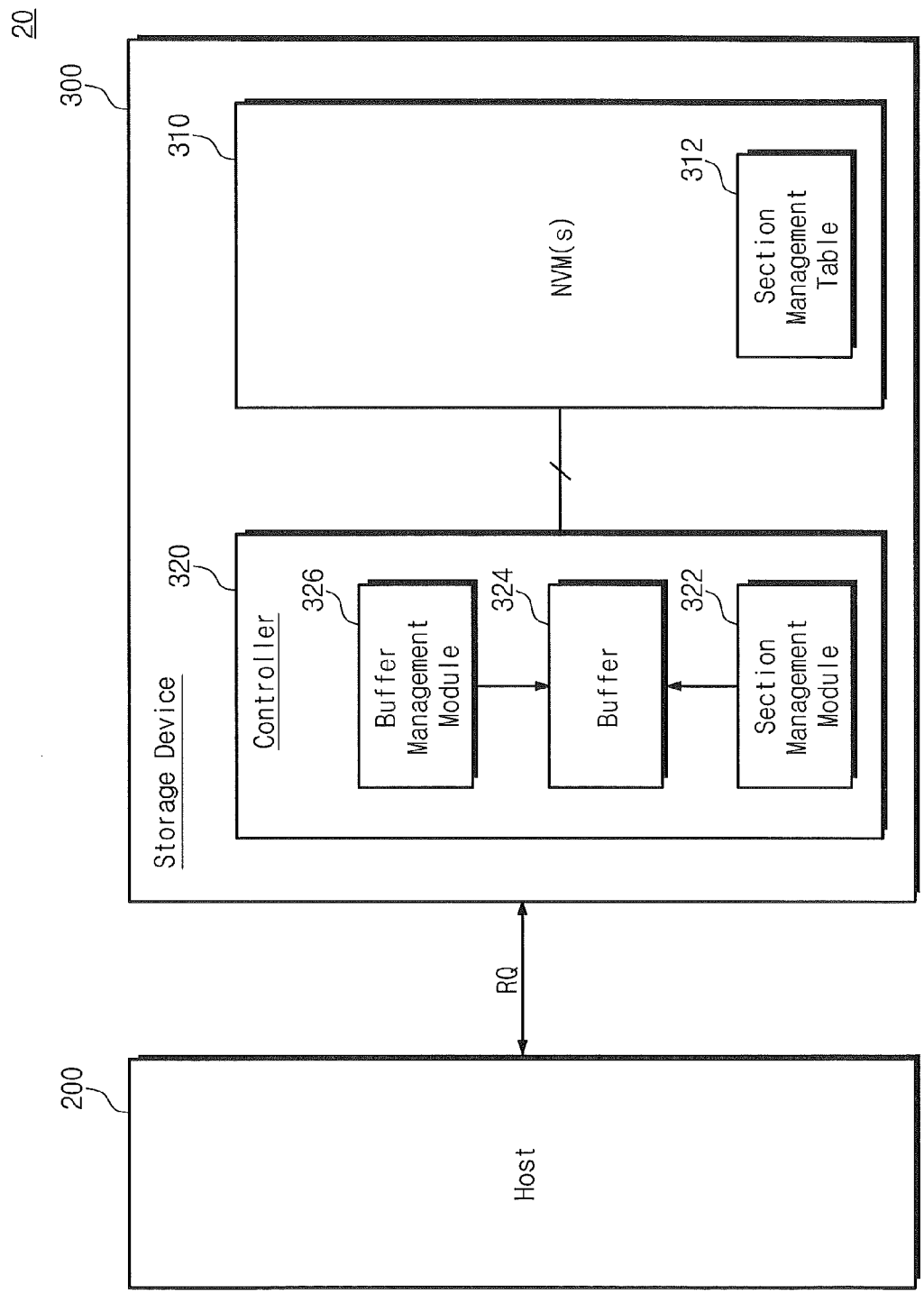
FIG. 17 is a block diagram schematically illustrating an electronic device including a storage device according to another embodiment of the inventive concept.

FIG. 17 is a block diagram schematically illustrating an electronic device including a storage device according to another embodiment of the inventive concept. Referring to FIG. 17, a storage device 300 may be equal to a storage device 100 in FIG. 1 except a section management table 312 is further included. A nonvolatile memory device 310 may include the section management table 312, and a controller 320 may include a section management module 322, a buffer 324, and a buffer management module 324. The storage device 300 of the inventive concept may store section information for managing data of sections generated according to input/output requests RQ in a section management table 312.

Figure 18:
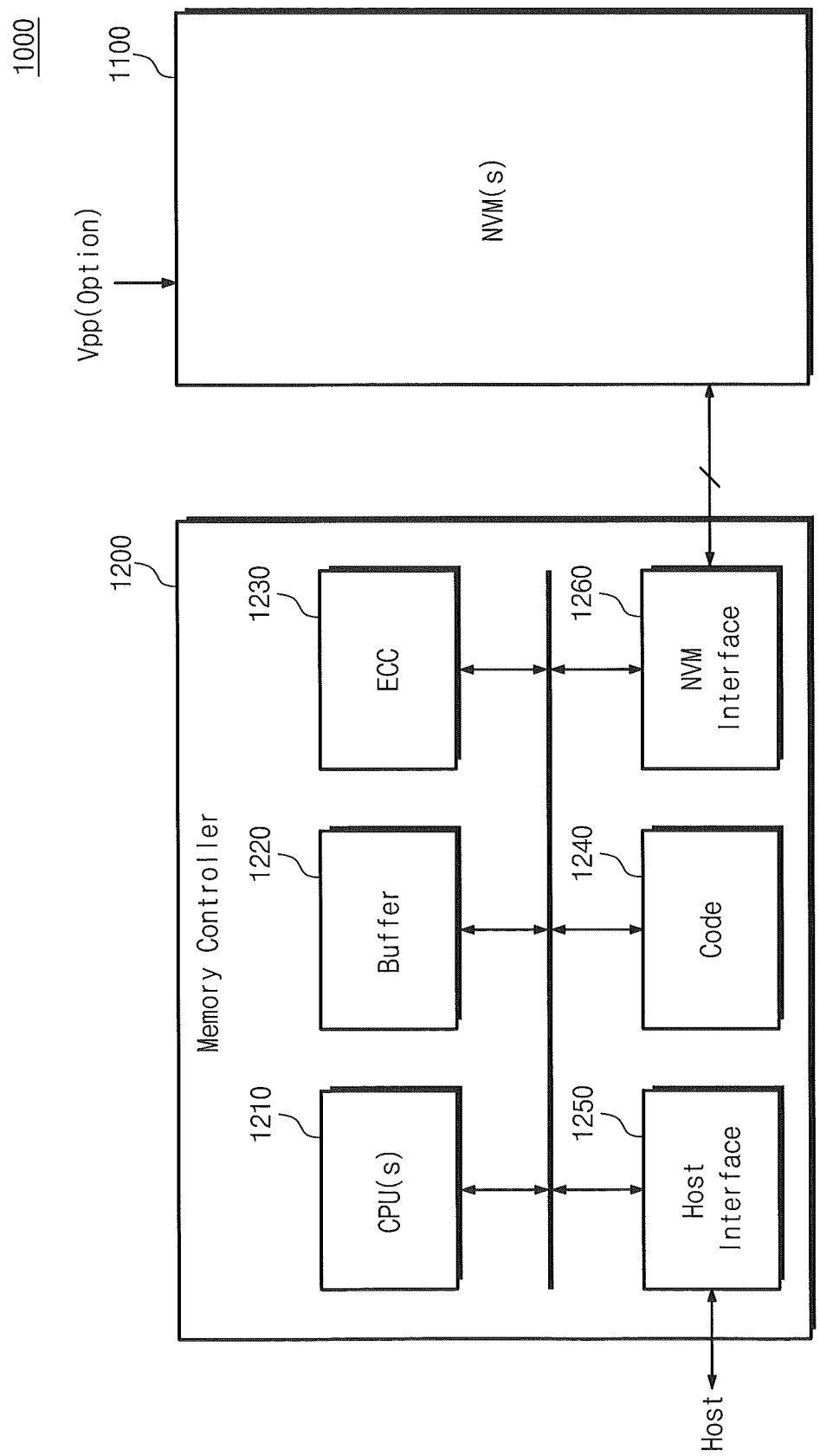
FIG. 18 is a block diagram schematically illustrating a memory system according to an embodiment of the inventive concept.

FIG. 18 is a block diagram schematically illustrating a memory system according to an embodiment of the inventive concept. Referring to FIG. 18, a memory system 1000 may include at least one nonvolatile memory device 1100 and a memory controller 1200. The memory system 1000 may make generation of section and management of section data according to an input/output request as described with reference to FIGS. 1 to 17. The nonvolatile memory device 1100 may be optionally supplied with a high voltage Vpp from the outside. The memory controller 1200 may be connected with the nonvolatile memory device 1100 via a plurality of channels. The memory controller 1200 may include at least one Central Processing Unit (CPU) 1210, a buffer memory 1220, an ECC circuit 1230, a code 1240, a host interface 1250, and a memory interface 1260. Although not shown in FIG. 18, the memory controller 1200 may further comprise a randomization circuit that randomizes and de-randomizes data. The memory system 1000 according to an embodiment of the inventive concept is applicable to a perfect page new (PPN) memory. Detailed description of the memory system is disclosed in U.S. Pat. No. 8,027,194 and U.S. Patent Publication No. 2010/0082890, the entire contents of which are herein incorporated by reference.

Figure 19:
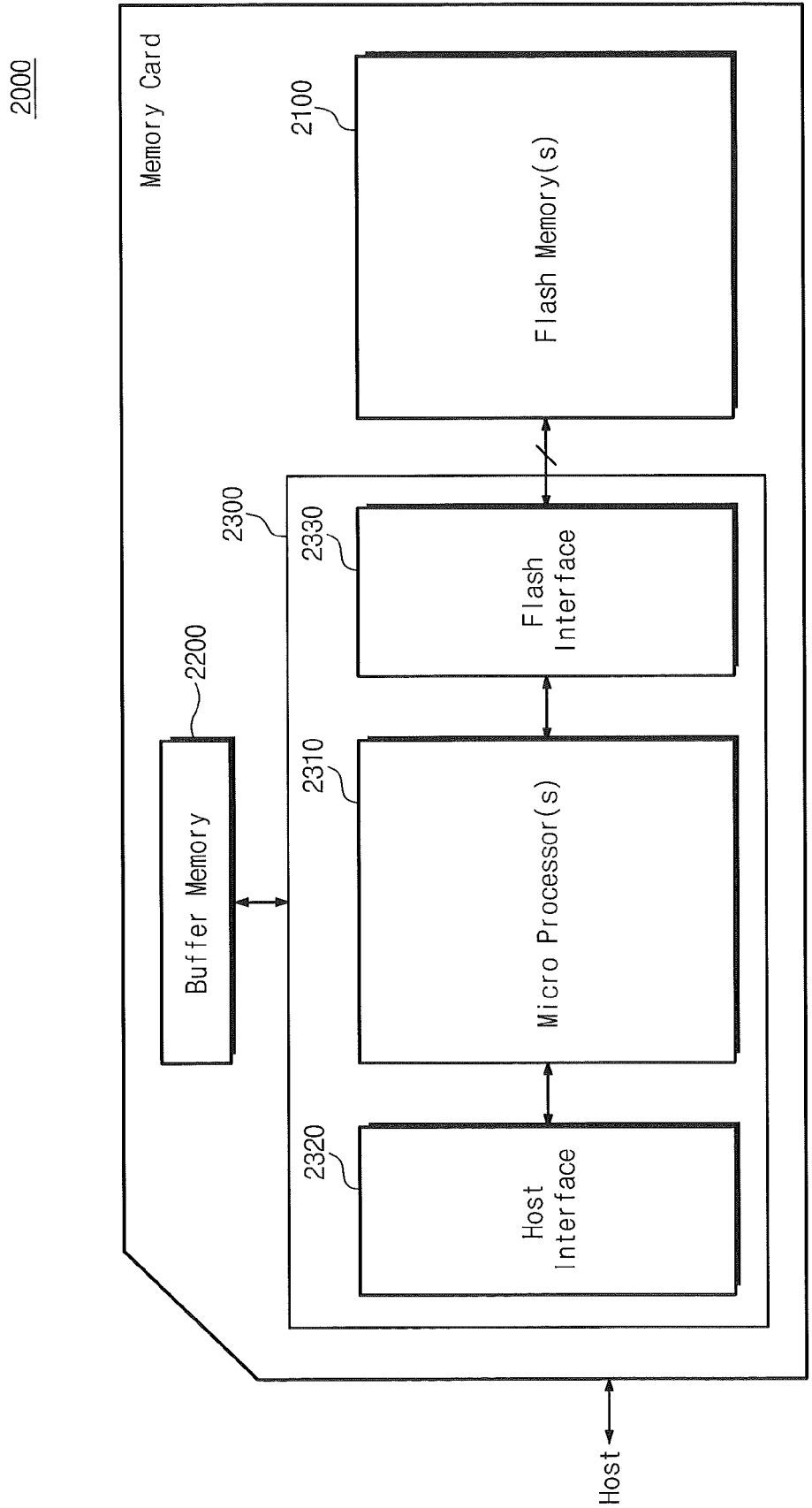
FIG. 19 is a block diagram schematically illustrating a memory card according to an embodiment of the inventive concept.

FIG. 19 is a block diagram schematically illustrating a memory card according to an embodiment of the inventive concept. Referring to FIG. 19, a memory card 2000 may include at least one flash memory 2100, a buffer memory device 2200, and a memory controller 2300 for controlling the flash memory 2100 and the buffer memory device 2200. The memory card 2000 may make generation of section and management of section data according to an input/output request as described with reference to FIGS. 1 to 17.

The buffer memory device 2200 may be used to temporarily store data generated during the operation of the memory card 2000. The buffer memory device 2200 may be implemented using a DRAM or an SRAM. The memory controller 2300 may be connected with the flash memory 2100 via a plurality of channels. The memory controller 2300 may be connected between a host and the flash memory 2100. The memory controller 2300 may be configured to access the flash memory 2100 in response to a request from the host.

The memory controller 2300 may include at least one microprocessor 2310, a host interface 2320, and a flash interface 2330. The microprocessor 2310 may be configured to drive firmware. The host interface 2320 may interface with the host via a card protocol (e.g., SD/MMC) for data exchanges between the host and the memory card 2000. The memory card 2000 is applicable to Multimedia Cards (MMCs), Security Digitals (SDs), miniSDs, memory sticks, smartmedia, and transflash cards.

Figure 20:
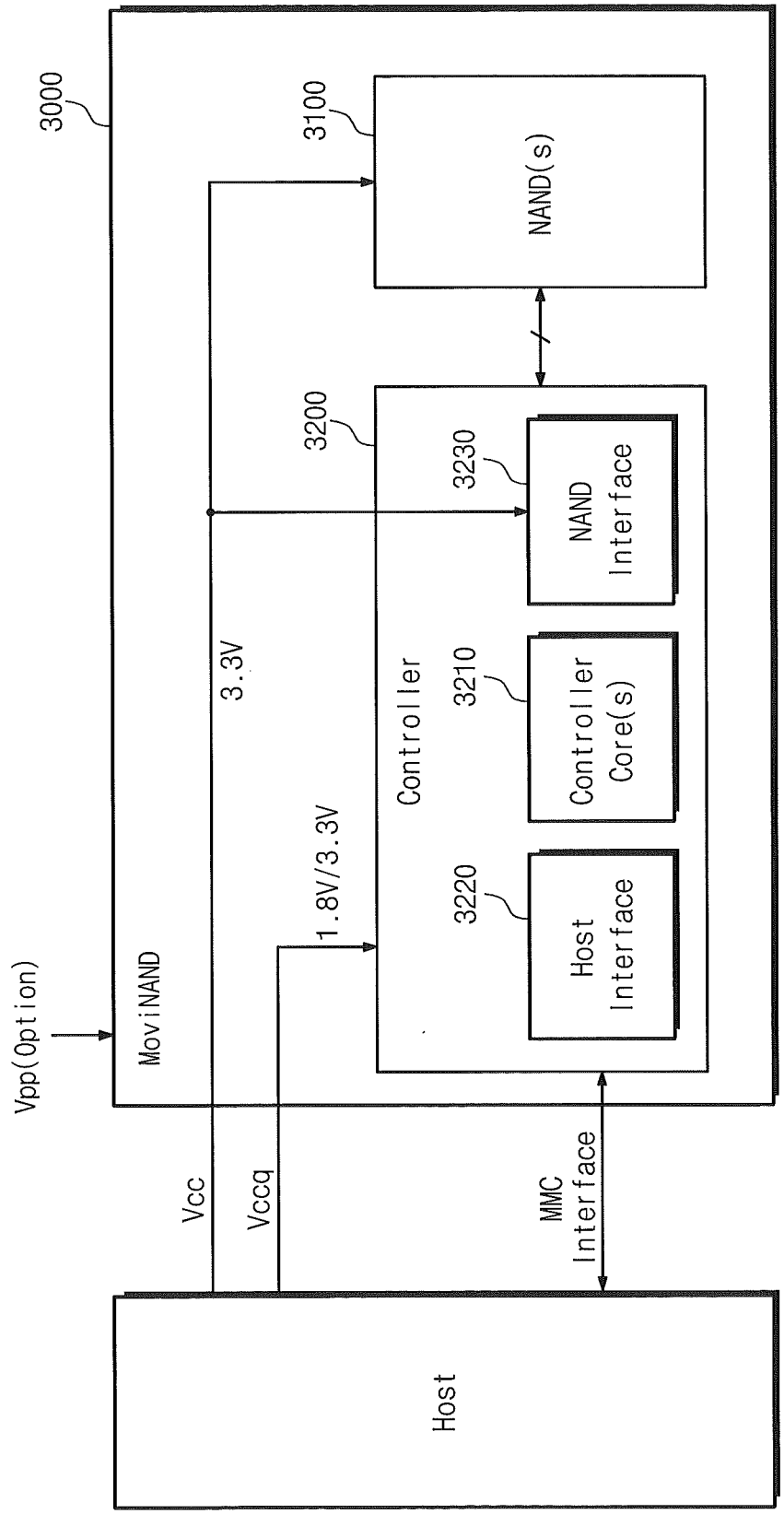
FIG. 20 is a block diagram schematically illustrating a moviNAND according to an embodiment of the inventive concept.

FIG. 20 is a block diagram schematically illustrating a moviNAND according to an embodiment of the inventive concept. Referring to FIG. 20, a moviNAND device 3000 may include at least one NAND flash memory device 3100 and a controller 3200. The moviNAND device 3000 may support the MMC 4.4 (or, referred to as "eMMC") standard. The moviNAND device 3000 may make generation of section and management of section data according to an input/output request as described with reference to FIGS. 1 to 17.

The NAND flash memory device 3100 may be a single data rate (SDR) NAND flash memory device or a double data rate (DDR) NAND flash memory device. In example embodiments, the NAND flash memory device 3100 may include NAND flash memory chips. Herein, the NAND flash memory device 3100 may be implemented by stacking the NAND flash memory chips at one package (e.g., FBGA, Fine-pitch Ball Grid Array, etc.).

The controller 3200 may be connected with the flash memory device 3100 via a plurality of channels. The controller 3200 may include at least one controller core 3210, a host interface 3220, and a NAND interface 3230. The controller core 3210 may control an overall operation of the moviNAND device 3000.

The host interface 3220 may be configured to perform an MMC interface between the controller 3210 and a host. The NAND interface 3230 may be configured to interface between the NAND flash memory device 3100 and the controller 3200. In example embodiments, the host interface 3220 may be a parallel interface (e.g., an MMC interface). In other example embodiments, the host interface 3250 of the moviNAND device 3000 may be a serial interface (e.g., UHS-II, UFS, etc.).

The moviNAND device 3000 may receive power supply voltages Vcc and Vccq from the host. Herein, the power supply voltage Vcc (about 3V) may be supplied to the NAND flash memory device 3100 and the NAND interface 3230, while the power supply voltage Vccq (about 1.8V/3V) may be supplied to the controller 3200. In example embodiments, an external high voltage Vpp may be optionally supplied to the moviNAND device 3000.

The moviNAND device 3000 according to an embodiment of the inventive concept may be advantageous to store mass data as well as may have an improved read characteristic. The moviNAND device 3000 according to an embodiment of the inventive concept is applicable to small and low-power mobile products (e.g., a Galaxy S, iPhone, etc.).

The moviNAND device 3000 illustrated in FIG. 20 may be supplied with a plurality of power supply voltages Vcc and Vccq. However, the inventive concept is not limited thereto. The moviNAND device 3000 can be configured to generate a power supply voltage of 3.3V suitable for a NAND interface and a NAND flash memory by boosting or regulating the power supply voltage Vcc internally. Internal boosting or regulating is disclosed in U.S. Pat. No. 7,092,308, the entire contents of which are herein incorporated by reference.

Figure 21:
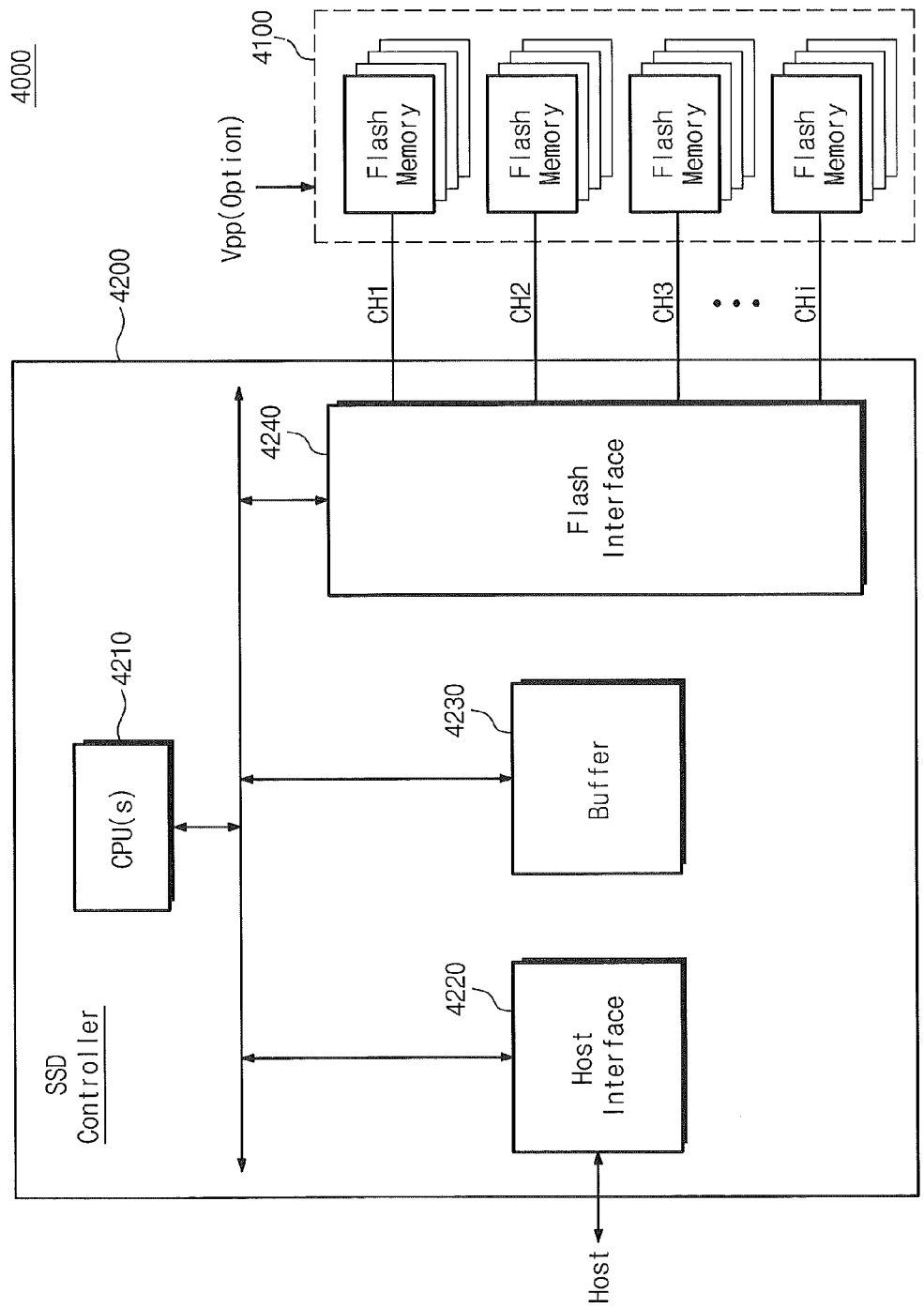
FIG. 21 is a block diagram schematically illustrating a solid state drive according to an embodiment of the inventive concept.

FIG. 21 is a block diagram schematically illustrating a solid state drive according to an embodiment of the inventive concept. Referring to FIG. 21, a solid state drive (SSD) 4000 may include a plurality of flash memory devices 4100 and an SSD controller 4200. The SSD 4000 may make generation of section and management of section data according to an input/output request as described with reference to FIGS. 1 to 17.

The flash memory devices 4100 may be optionally supplied with a high voltage Vpp from the outside. The SSD controller 4200 may be connected to the flash memory devices 4100 via a plurality of channels CH1 to CHi. The SSD controller 4200 may include at least one CPU 4210, a host interface 4220, a buffer memory 4230, and a flash interface 4240.

Under the control of the CPU 4210, the host interface 4220 may exchange data with a host through the communication protocol. In example embodiments, the communication protocol may include the Advanced Technology Attachment (ATA) protocol. The ATA protocol may include a Serial Advanced Technology Attachment (SATA) interface, a Parallel Advanced Technology Attachment (PATA) interface, an External SATA (ESATA) interface, and the like. In other example embodiments, the communication protocol may include the Universal Serial Bus (UBS) protocol. Data to be received or transmitted from or to the host through the host interface 4220 may be delivered through the buffer memory 4230 without passing through a CPU bus, under the control of the CPU 4210.

The buffer memory 4230 may be used to temporarily store data transferred between an external device and the flash memory devices 4100. The buffer memory 4230 can be used to store programs to be executed by the CPU 4210. The buffer memory 4230 may be implemented using an SRAM or a DRAM. The buffer memory 4230 in FIG. 21 may be included within the SSD controller 4200. However, the inventive concept is not limited thereto. The buffer memory 4230 according to an embodiment of the inventive concept can be provided at the outside of the SSD controller 4200.

The flash interface 4240 may be configured to interface between the SSD controller 4200 and the flash memory devices 4100 that are used as storage devices. The flash interface 4240 may be configured to support NAND flash memories, One-NAND flash memories, multi-level flash memories, or single-level flash memories.

The SSD 400 according to an embodiment of the inventive concept may improve the reliability of data by storing random data at a program operation. More detailed description of the SSD 4000 is disclosed in U.S. Pat. No. 8,027,194 and U.S. Patent Publication Nos. 2007/0106836 and 2010/0082890, the entire contents of which are herein incorporated by reference.

Figure 22:
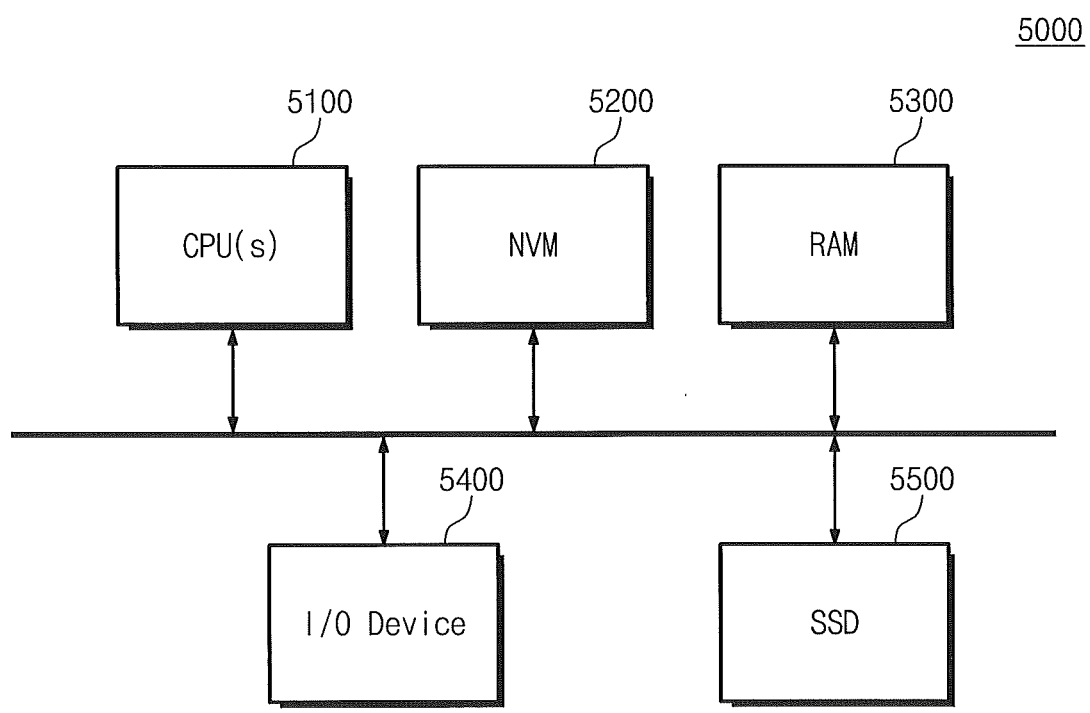
FIG. 22 is a block diagram schematically illustrating a computing system including an SSD in FIG. 21 according to an embodiment of the inventive concept.

FIG. 22 is a block diagram schematically illustrating a computing system including an SSD in FIG. 21 according to an embodiment of the inventive concept. Referring to FIG. 22, a computing system 5000 may include at least one CPU 5100, a nonvolatile memory device 5200, a RAM 5300, an input/output (I/O) device 5400, and an SSD 5500.

The CPU 5100 may be connected to a system bus. The nonvolatile memory device 5200 may store data used to drive the computing system 5000. Herein, the data may include a start command sequence or a basic I/O system (BIOS) sequence. The RAM 5300 may temporarily store data generated during the execution of the CPU 5100. The I/O device 5400 may be connected to the system bus through an I/O device interface such as keyboards, pointing devices (e.g., mouse), monitors, modems, and the like. The SSD 5500 may be a readable storage device and may be implemented the same as the SSD 4000 of FIG. 21.

Figure 23:
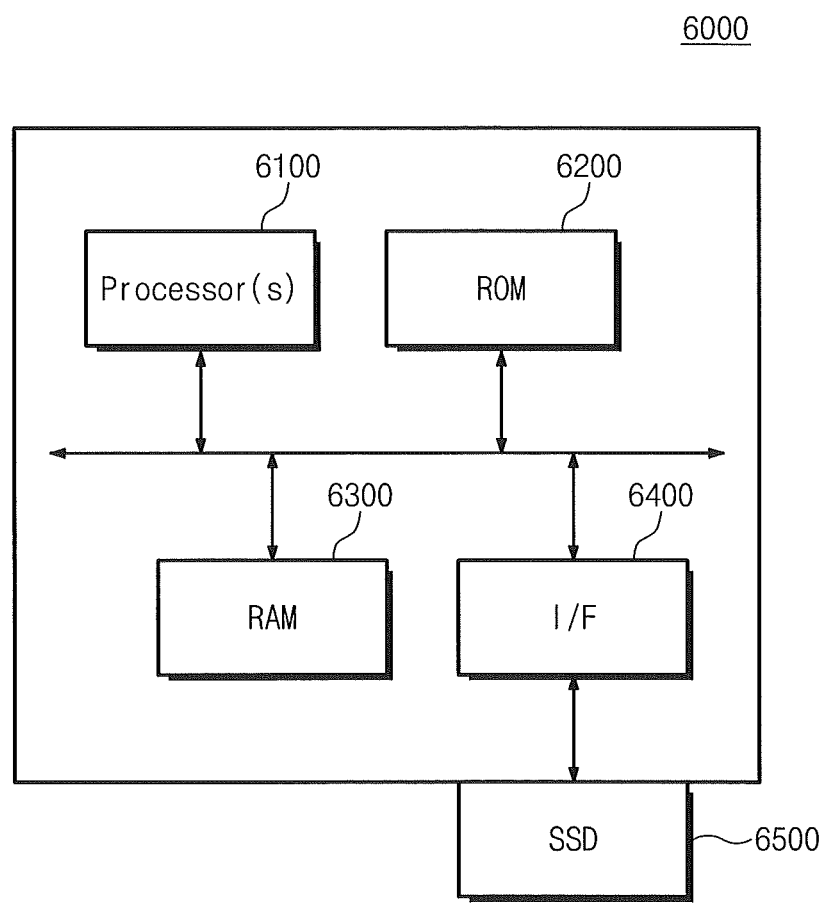
FIG. 23 is a block diagram schematically illustrating an electronic device including an SSD in FIG. 21 according to an embodiment of the inventive concept.

FIG. 23 is a block diagram schematically illustrating an electronic device including an SSD in FIG. 21 according to an embodiment of the inventive concept. Referring to FIG. 23, an electronic device 6000 may include a processor 6100, a ROM 6200, a RAM 6300, a flash interface 6400, and at least one SSD 6500. The processor 6100 may access the RAM 6300 to execute firmware codes or other codes. Also, the processor 6100 may access the ROM 6200 to execute fixed command sequences such as a start command sequence and a basic I/O system (BIOS) sequence. The flash interface 6400 may be configured to interface between the electronic device 6000 and the SSD 6500. The SSD 6500 may be detachable from the electronic device 6000. The SSD 6500 may be implemented the same as the SSD 4000 of FIG. 21. The electronic device 6000 may include cellular phones, personal digital assistants (PDAs), digital cameras, camcorders, portable audio players (e.g., MP3), and portable media players (PMPs).

Figure 24:
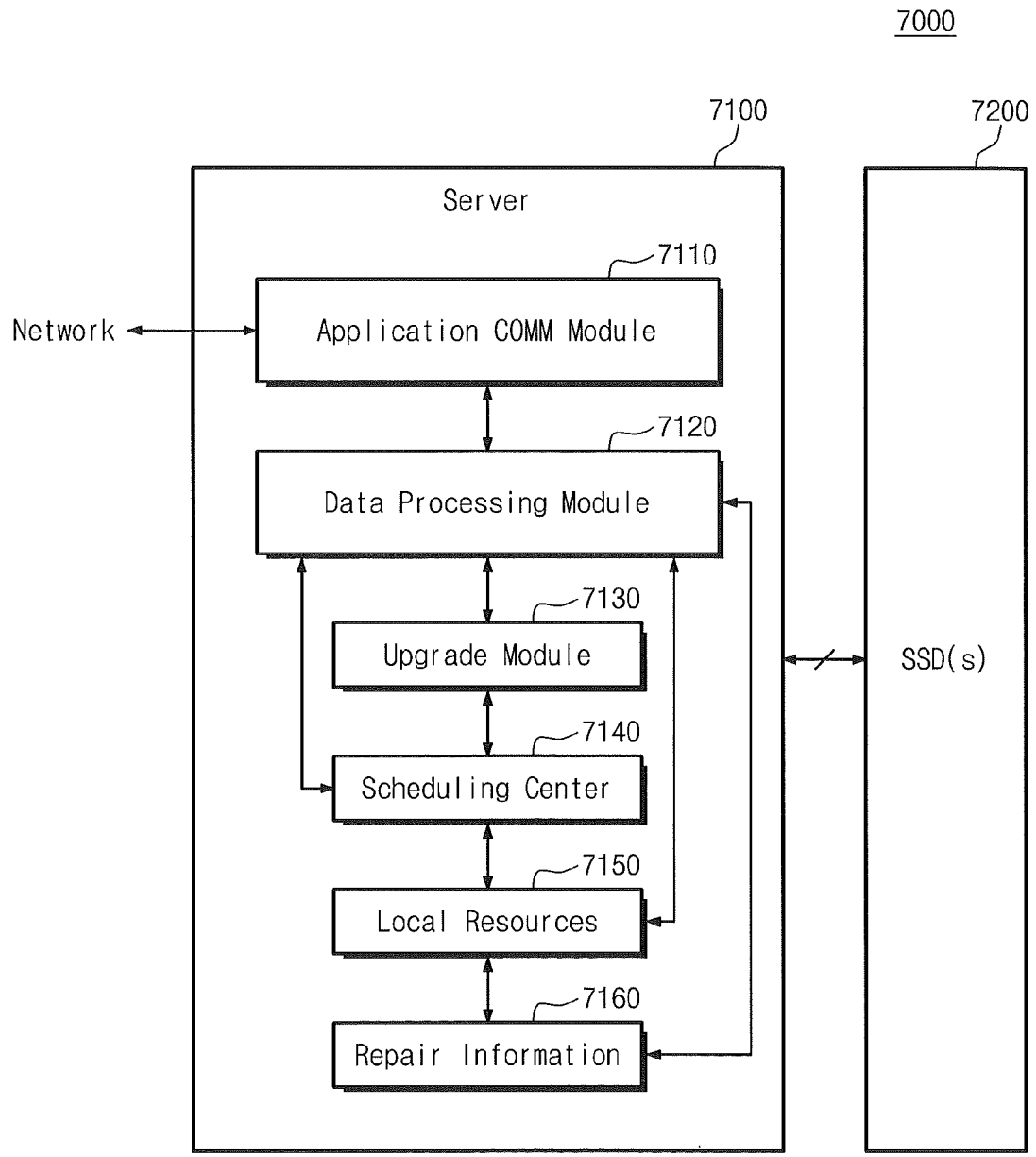
FIG. 24 is a block diagram schematically illustrating a server system including an SSD in FIG. 21 according to an embodiment of the inventive concept.

FIG. 24 is a block diagram schematically illustrating a server system including an SSD in FIG. 21 according to an embodiment of the inventive concept. Referring to FIG. 24, a server system 7000 may include a server 7100 and at least one SSD 7200 that stores data used to drive the server 7100. The SSD 7200 may be configured the same as an SSD 4000 of FIG. 21. The server 7100 may include an application communication module 7110, a data processing module 7120, an upgrade module 7130, a scheduling center 7140, a local resource module 7150, and a repair information module 7160. The application communication module 7110 may be configured to communicate with a computing system connected to a network and the server 7100, or to allow the server 7100 to communicate with the SSD 7200. The application communication module 7110 may transmit data or information, provided through a user interface, to the data processing module 7120.

The data processing module 7120 may be linked to the local resource module 7150. Here, the local resource module 7150 may provide a list of repair shops/dealers/technical information to a user on the basis of information or data inputted to the server 7100. The upgrade module 7130 may interface with the data processing module 7120. Based on information or data received from the SSD 7200, the upgrade module 7130 may perform upgrades of a firmware, a reset code, a diagnosis system, or other information on electronic appliances.

The scheduling center 7140 may provide real-time options to the user based on the information or data inputted to the server 7100. The repair information module 7160 may interface with the data processing module 7120. The repair information module 7160 may be used to provide repair-related information (e.g., audio, video or document files) to the user. The data processing module 7120 may package information related to the information received from the SSD 7200. The packaged information may be transmitted to the SSD 7200 or may be displayed to the user.

Figure 25:
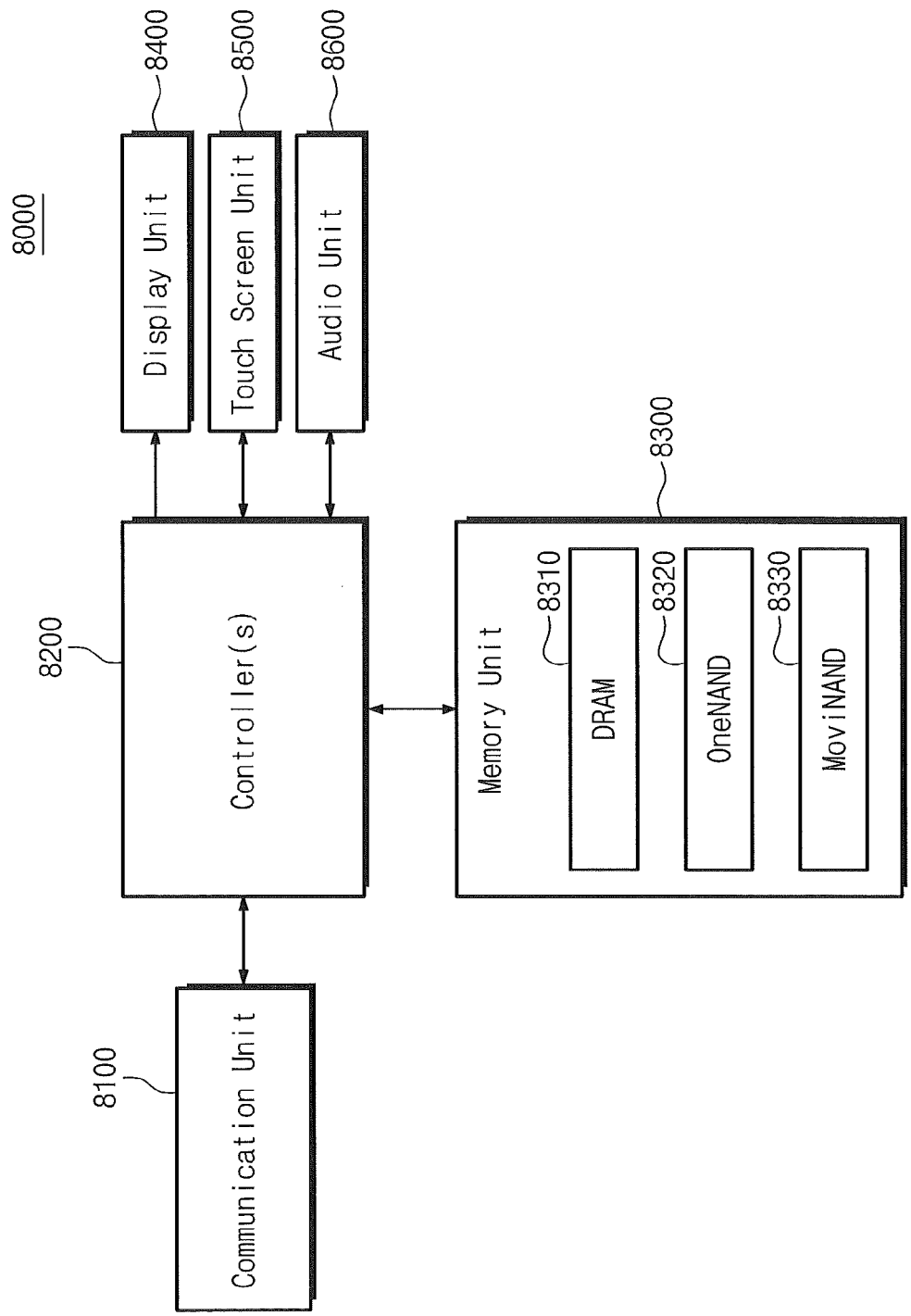
FIG. 25 is a block diagram schematically illustrating a mobile device according to an embodiment of the inventive concept.

FIG. 25 is a block diagram schematically illustrating a mobile device according to an embodiment of the inventive concept. Referring to FIG. 25, a mobile device 8000 may include a communication unit 8100, a controller 8200, a memory unit 8300, a display unit 8400, a touch screen unit 8500, and an audio unit 8600. The memory unit 8300 may include at least one DRAM 8310, at least one OneNAND 8320, and at least one moviNAND 8330. At least one of the OneNAND 8320 and the moviNAND 8330 may make generation of section and management of section data according to an input/output request as described with reference to FIGS. 1 to 17. Detailed descriptions of the mobile device are disclosed in U.S. Patent Publication Nos. 2010/0010040, 2010/0062715, 2010/00199081, and 2010/0309237, the entire contents of which are herein incorporated by reference.

Figure 26:
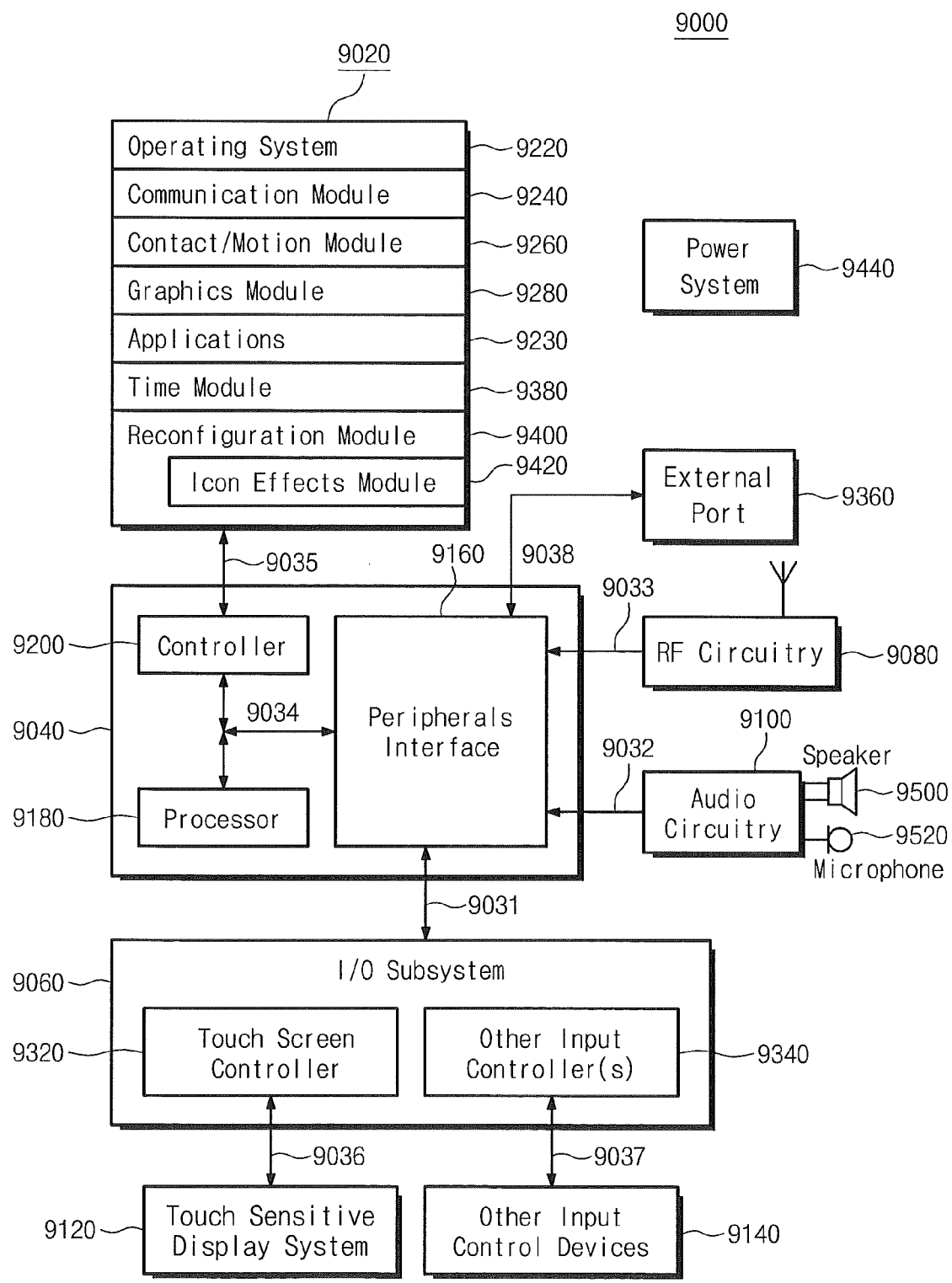
FIG. 26 is a block diagram schematically illustrating a handheld electronic device according to an embodiment of the inventive concept.

FIG. 26 is a block diagram schematically illustrating a handheld electronic device according to an embodiment of the inventive concept. Referring to FIG. 26, a handheld electronic device 9000 may include at least one computer-readable media 9020, a processing system 9040, an input/output sub-system 9060, a radio frequency circuit 9080, and an audio circuit 9100. Respective constituent elements can be interconnected by at least one communication bus or a signal line 9030.

The handheld electronic device 9000 may be a portable electronic device including a handheld computer, a tablet computer, a cellular phone, a media player, a PDA, or a combination of two or more thereof. Herein, the at least one computer-readable media 9020 may make generation of section and management of section data according to an input/output request as described with reference to FIGS. 1 to 17. Detailed description of the handheld electronic device 9000 is disclosed in U.S. Pat. No. 7,509,588, the entirety of which is incorporated by reference herein.

A memory system or a storage device according to the inventive concept may be mounted in various types of packages. Examples of the packages of the memory system or the storage device according to the inventive concept may include Package on Package (PoP), Ball Grid Arrays (BGAs), Chip Scale Packages (CSPs), Plastic Leaded Chip Carrier (PLCC), Plastic Dual In-line Package (PDIP), Die in Waffle Pack, Die in Wafer Form, Chip On Board (COB), Ceramic Dual In-line Package (CERDIP), Plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), System In Package (SIP), Multi Chip Package (MCP), Wafer-level Fabricated Package (WFP), and Wafer-level Processed Stack Package (WSP).

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A data managing method of a storage device which includes a nonvolatile memory device and a controller coupled to the nonvolatile memory device, the data managing method comprising:
   receiving an input/output request; and
   generating section directing logical addresses in response to the input/output request, wherein a section in a buffer is managed using section information, and the section information includes a start logical address corresponding to the input/output request, spatial locality information controlling the number of the directed logical addresses and historical request information,
   wherein the historical request information comprises a count of a number of accesses of the section.

2. The data managing method of claim 1, wherein the input/output request is one of a write request and a read request.

3. The data managing method of claim 2, wherein the historical request information includes a count of a number of write requests of the section and a count of a number of read requests of the section in the buffer.

4. The data managing method of claim 1, further comprising:
   judging whether a section corresponding to the input/output request exists.

5. The data managing method of claim 4, further comprising:
   when a section corresponding to the input/output request exists, using the existing section as the generated section, without generating of a new section.

6. The data managing method of claim 5, further comprising:
   updating the historical request information corresponding to the input/output request.

7. A data managing method of a storage device which includes a nonvolatile memory device and a controller coupled to the nonvolatile memory device, the data managing method comprising:
   receiving an input/output request;
   generating section directing logical addresses in response to the input/output request; and
   judging whether a section corresponding to the input/output request exists;
   when no section corresponding to the input/output request exists and address spaces of the generated section and a prior section are partially overlapped, generating a new section corresponding to the overlapped address space; and
   updating section information of the new section by adding historical request information according to the input/output request to historical request information of the prior section,
   wherein a section in a buffer is managed using section information, and the section information includes a start logical address corresponding to the input/output request, spatial locality information controlling the number of the directed logical addresses and historical request information.

8. The data managing method of claim 7, further comprising:
   generating another new section by subtracting the overlapped address space from the prior section; and
   updating section information of the another new section to have historical request information of the prior section.

9. A data managing method of a storage device which includes a nonvolatile memory device and a controller coupled to the nonvolatile memory device, the data managing method comprising:
   receiving an input/output request;
   generating section directing logical addresses in response to the input/output request; and
   judging whether a section corresponding to the input/output request exists;
   merging the generated section and the prior section when there is a prior section having spatial locality information continuous to the generated section and historical request information equal to historical request information of the generated section; and
   updating section information of the merged section,
   wherein a section in a buffer is managed using section information, and the section information includes a start logical address corresponding to the input/output request, spatial locality information controlling the number of the directed logical addresses and historical request information.

10. The data managing method of claim 9, wherein the generated section and the prior section are merged when the storage device is in an idle state.

11. The data managing method of claim 1, wherein the section information is stored in a buffer.

12. A data managing method of a storage device which includes a nonvolatile memory device and a controller coupled to the nonvolatile memory device, the data managing method comprising:
    receiving an input/output request; and
    generating section directing logical addresses in response to the input/output request, wherein a section in a buffer is managed using section information, and the section information includes a start logical address corresponding to the input/output request, spatial locality information controlling the number of the directed logical addresses and historical request information,
    wherein the section information further includes deduplication information executed to the generated section;
    and wherein the data managing method comprises performing deduplication using the deduplication information.

13. The data managing method of claim 12, wherein the input/output request is a write request, the deduplication information includes a deduplication ratio directing the number of logical addresses experiencing deduplication, from among the directed logical addresses, and the deduplication is performed when the deduplication ratio is larger than a reference value.

14. The data managing method of claim 12, wherein the input/output request is a write request, the deduplication information includes a deduplication ratio directing the number of logical addresses experiencing deduplication, from among the directed logical addresses, and data is stored in the nonvolatile memory device according to the write request when the deduplication ratio is smaller than a reference value.

15. A storage device comprising:

at least one nonvolatile memory device; and a controller controlling the at least one nonvolatile memory device, wherein the controller comprises:

a section management module generating a section directing logical addresses corresponding to an input/output request; and a buffer storing data and section information of the section according to the input/output request, the section information including spatial locality information directing the logical addresses and historical request information having a write request number, corresponding to a count of a number of write requests of the section, and a read request number, corresponding to a count of a number of read requests of the section.

16. The data managing method of claim 4, further comprising:

when a section corresponding to the input/output request does not exist, generating a new section.

* * * * *